R. F. McFEELY.
MACHINE FOR SHAPING UPPERS TO LASTS.
APPLICATION FILED MAY 1, 1916.

1,366,472.

Patented Jan. 25, 1921.
9 SHEETS—SHEET 1.

INVENTOR

R. F. McFEELY.
MACHINE FOR SHAPING UPPERS TO LASTS.
APPLICATION FILED MAY 1, 1916.

1,366,472.

Patented Jan. 25, 1921.
9 SHEETS—SHEET 3.

INVENTOR.

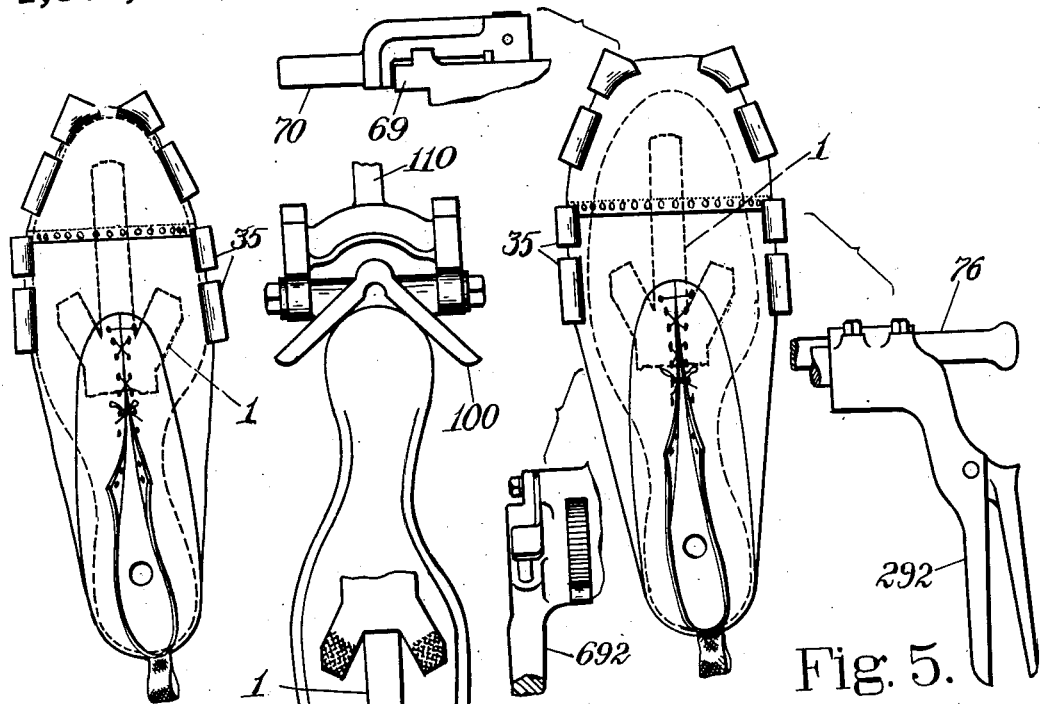
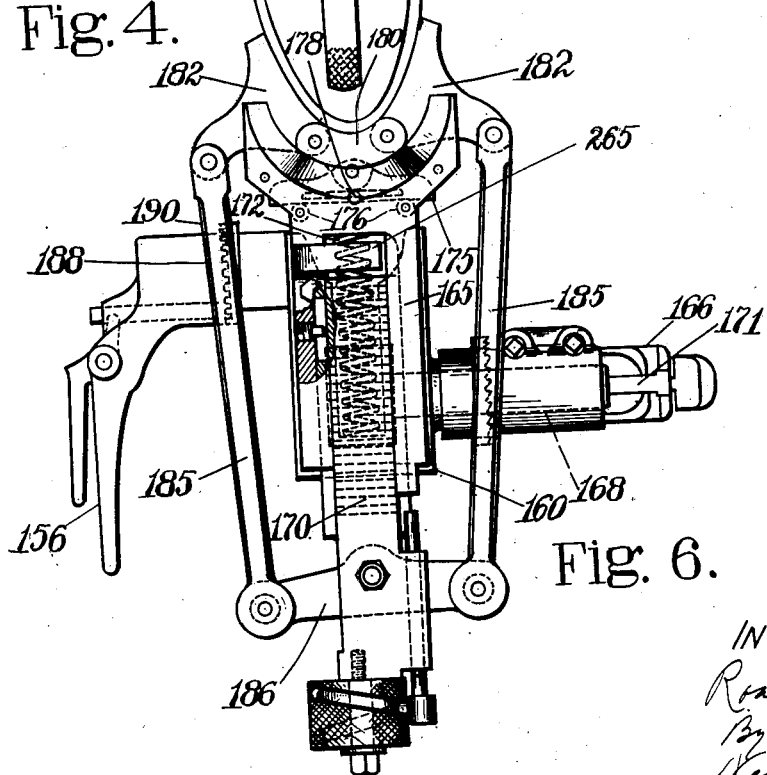

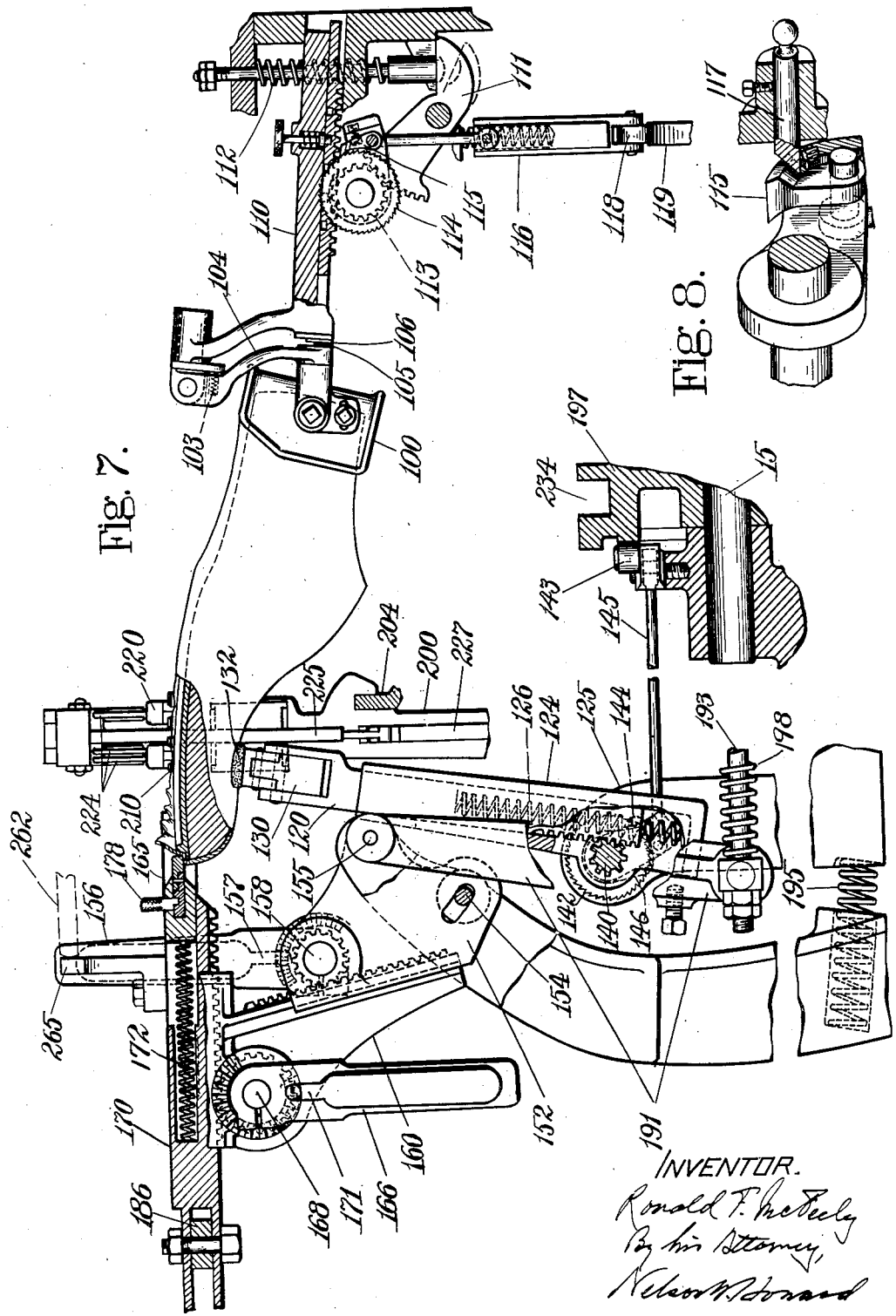

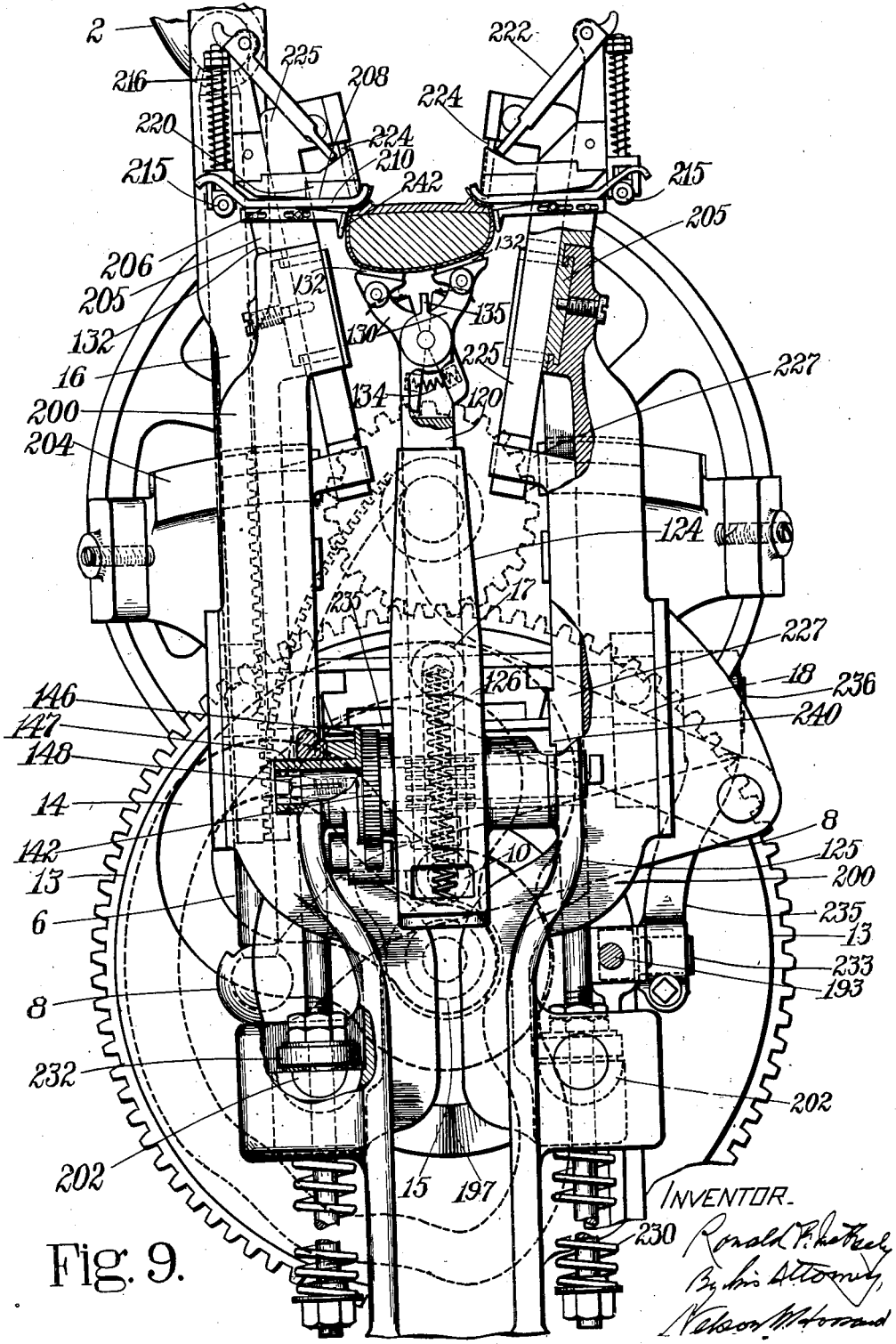

R. F. McFEELY.
MACHINE FOR SHAPING UPPERS TO LASTS.
APPLICATION FILED MAY 1, 1916.

1,366,472.

Patented Jan. 25, 1921.
9 SHEETS—SHEET 7.

INVENTOR
Ronald F. McFeely
By his Attorney
Nelson M. Howard

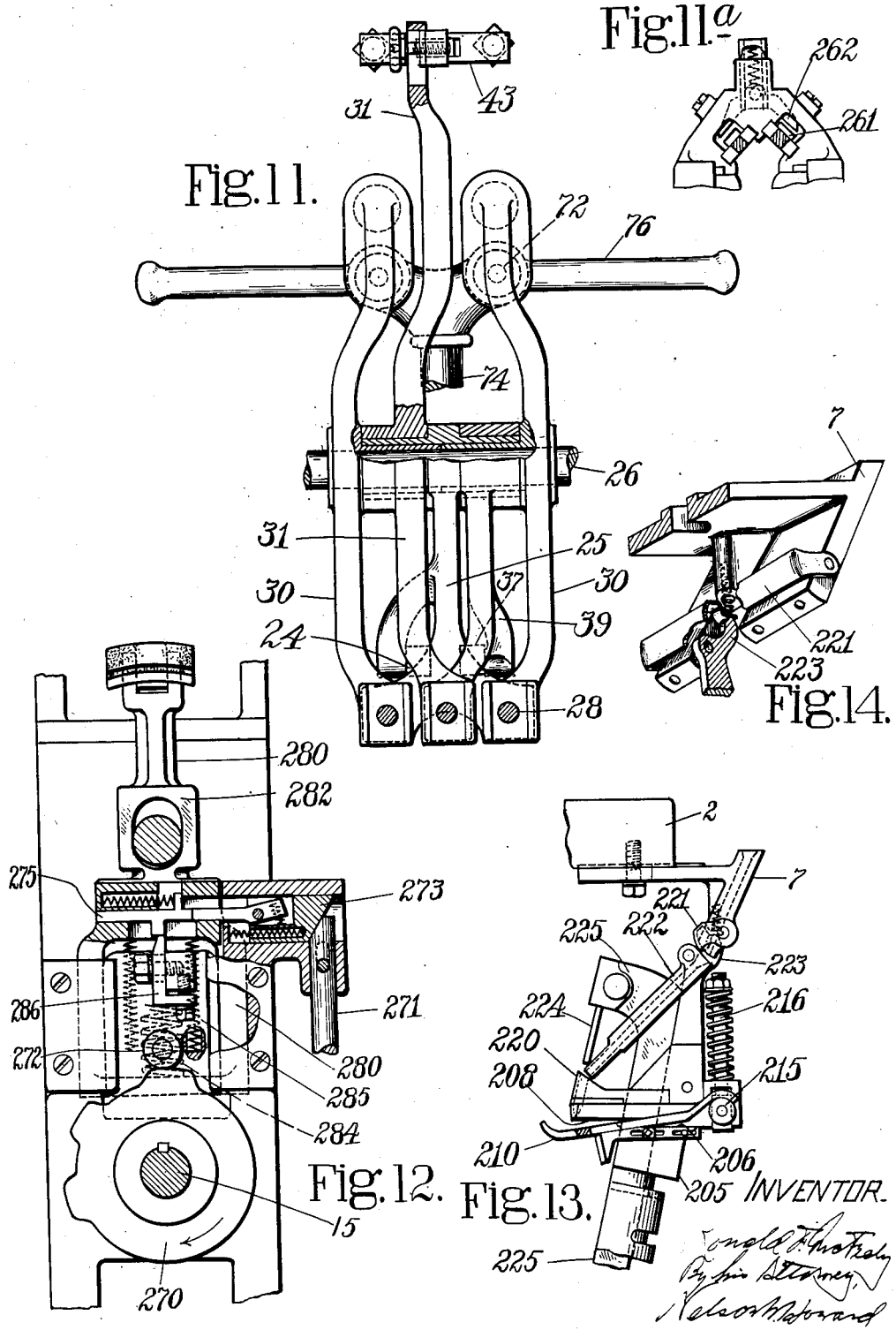

R. F. McFEELY.
MACHINE FOR SHAPING UPPERS TO LASTS.
APPLICATION FILED MAY 1, 1916.

1,366,472.

Patented Jan. 25, 1921.

UNITED STATES PATENT OFFICE.

RONALD F. McFEELY, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

MACHINE FOR SHAPING UPPERS TO LASTS.

1,366,472. Specification of Letters Patent. Patented Jan. 25, 1921.

Application filed May 1, 1916. Serial No. 94,675.

*To all whom it may concern:*

Be it known that I, RONALD F. McFEELY, a citizen of the United States, residing at Beverly, in the county of Essex and State of Massachusetts, have invented certain Improvements in Machines for Shaping Uppers to Lasts, of which the following description, in connection with the accompanying drawings, is a specification, like reference characters on the drawings indicating like parts in the several figures.

This invention relates to shoemaking machinery and involves carrying forward the inventions set forth in certain prior United States Letters Patent granted on my applications including Nos. 1,135,949 and 1,135,950 issued April 13, 1915 for improvements in machines for use in the manufacture of boots and shoes.

A broad feature of this present invention consists in a novel organization and arrangement of mechanism to pull-over the shoe in a position which is appropriate for the performance of that operation, to last a portion of the shoe in a position which is more advantageous for the lasting operation, and to change the posture or position of the shoe between the pulling-over and the lasting operations, the illustrative machine shown having means for changing the angular presentation of the shoe with reference to a horizontal plane. The machines shown in my prior patents are organized to perform both the lasting and the pulling-over operations with the shoe in the same position, that being the position which has been found satisfactory for pulling over shoes. Such an organization does not afford all of the advantages which can be obtained from that here disclosed. Among other things it may be noted that convenience in lasting is sacrificed by working in the pulling-over position, whereas a different altitude and angular presentation of the shoe enables lasting to be carried on with more ease and accuracy; the close proximity of the pulling-over mechanism interferes with the carrying on of the lasting, particularly with pulling out a wrinkle in the toe of the upper if one remains in the pulled upper, and also interferes with tensioning a toe binder and fastening the ends of the binder; and while either the pulling-over mechanism or the lasting mechanism is in use the other of said mechanisms must remain idle.

Another feature of this invention consists in pulling-over mechanism and lasting mechanism arranged to operate successively on a shoe in successive postures of the shoe, combined with means movable to carry the shoe about an axis extending laterally with reference to the shoe in shifting the shoe between pulling-over and lasting postures.

Still another feature of the invention resides in novel means for changing the posture or position of the shoe, the machine shown being organized to carry the shoe automatically in pulled-over condition from a pulling-over location to a lasting location. In the illustrative embodiment of these features of the invention the pulling-over mechanism moves with the pulled-over shoe to the lasting mechanism and holds the upper under tension until the lasting mechanism takes control of the tensioned upper. In the use of such an embodiment of the invention there need be no pulling-over tacks or other temporary fastenings employed to hold the upper between the pulling-over and the lasting operations, and yet there is no loss of pulling-over tension before the lasting is effected.

A further feature of this invention consists in pulling-over mechanism and lasting mechanism organized to permit the lasting mechanism to operate on a pulled-over shoe while a second shoe is being prepared by the pulling-over mechanism for the lasting operation, with or without the provision that the machine is organized to carry the pulled-over shoe under tension from the pulling-over position to the lasting position. This organization has the advantage that both mechanisms can be operating on shoes at the same time and makes possible the allowance of more time for each shoe to remain in a mechanism without correspondingly reducing the output of the machine.

Another feature of the invention consists in the combination of pulling-over mechanism and automatic lasting mechanism adapted to operate successively on a shoe and arranged and organized for a pulled-over shoe to be subjected to the action of the automatic lasting mechanism while another shoe is being prepared for the lasting operation by use of the pulling-over mechanism, with or without the further arrangement that the pulling-over mechanism delivers the shoes successively to the automatic lasting mechanism.

The illustrative machine comprises pulling-over mechanism arranged to receive a shoe in a position with the toe pointing upwardly and it may be somewhat forwardly as shown and the top face of the forepart of the shoe toward the operative at an altitude approximating that of the operative's eyes, and a toe lasting mechanism located below the pulling-over mechanism in a substantially horizontal plane and occupying a position between the general vertical plane of the operative's back and a parallel plane through the pulling-over mechanism. The pulling-over mechanism is movable with the pulled-over shoe therein about a transverse horizontal axis in an arc of less than 180° to change the angular presentation of the shoe and deliver it to the lasting mechanism with the toe and heel at the same altitude and the sole face of the shoe upward. The lasting mechanism is arranged to wipe up the toe of the upper as the shoe is delivered to it and then to wipe the upper inwardly over the toe end and the sides of the forepart of the last while the pulling-over mechanism retires to position for pulling-over a second shoe. Side wiping mechanism is also provided, with tacking means associated with the side wiping mechanism, and the inward wiping and the tacking operations are performed by power driven means, and it is contemplated that the toe wipers shall be closed and partially opened a plurality of times for rubbing the inwardly wiped upper, it having been found that a multiple wipe under suitably regulated pressure is particularly effective in setting the sole attaching flange of upper leather in lasted position. This position may be maintained by tacks or binding wire or any other of the known securing means.

Among its other important features the invention provides a novel organization whereby the upper of a shoe is pulled over in one position and is fastened with the shoe presented in a different position, a novel construction and arrangement of shoe positioning means, novel means for stretching an upper over the top of the forepart of a last, novel upper pulling means including provision for various gripper adjustments, novel end lasting mechanism and upper fastening mechanism, and a novel construction and arrangement of operating and controlling means.

These and many other important features of this invention will appear from the following description read in connection with the accompanying drawings and will be particularly pointed out in the claims.

Figure 1 of the drawings shows a side elevation of the machine.

Fig. 4 is a view of the shoe and of the grippers as the operative sees the work and grippers at the time the grippers seize the upper.

Fig. 5 is a similar view showing the work after the grippers have seized and pulled the upper and come to rest holding the upper under tension for inspection and adjustment, if necessary, by means of the various adjusting devices with which the machine is provided and which are shown in this figure as being grouped around the shoe in substantially their operative relation. The last is indicated by dotted lines in Figs. 4 and 5 and the important extent of the outdrawing or spreading movement of the grippers in stretching the forepart of the upper smoothly as a preparation for lasting may be seen by comparing the two figures.

Fig. 6 is a view of the shoe after it has been turned through approximately 90° by the movement of the pulling-over head downwardly and forwardly to deliver the pulled-over shoe into the shoe resting means and the forepart lasting mechanism, a toe lasting mechanism being shown in plan in this figure.

Fig. 7 is a side elevation of the pulled-over shoe and the shoe resting and lasting mechanisms in operative engagement therewith.

Fig. 8 is a detail view of the mechanism employed for positively advancing the heel rest automatically and locking the heel rest in its advanced position. A similar mechanism having a corresponding function is employed for operating the toe rest and because of such similarity it is unnecessary to illustrate the toe rest advancing and locking mechanism in detail.

Fig. 9 is a vertical sectional view showing the toe resting and the side lasting and tacking mechanisms. This view also presents a front elevation of the cam mechanism located in the lower part of the machine.

Figure 10:
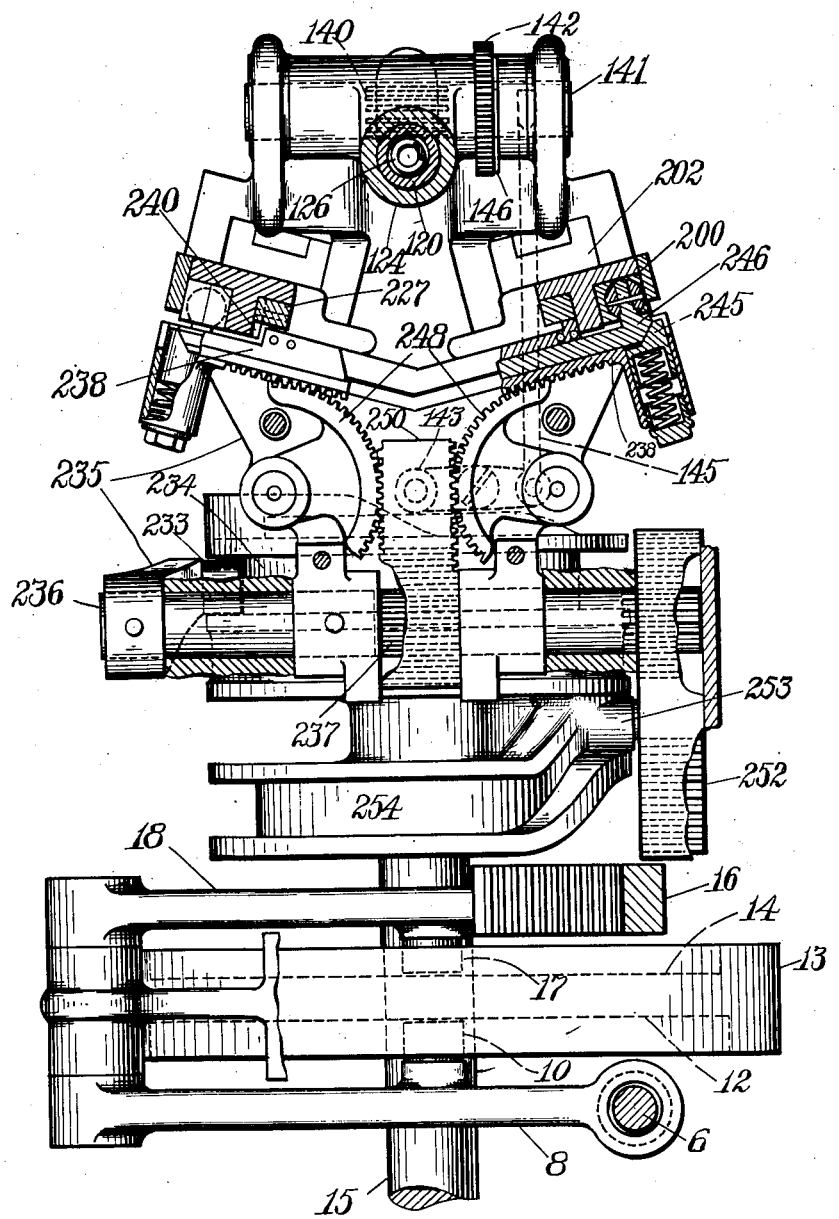

Fig. 10 is a horizontal section through the toe rest support and the side lasting and tacking arms and shows a plan view of the mechanism by which the said arms are swung in and out and also a plan view of the cam mechanism located in the lower part of the machine.

Figure 1:
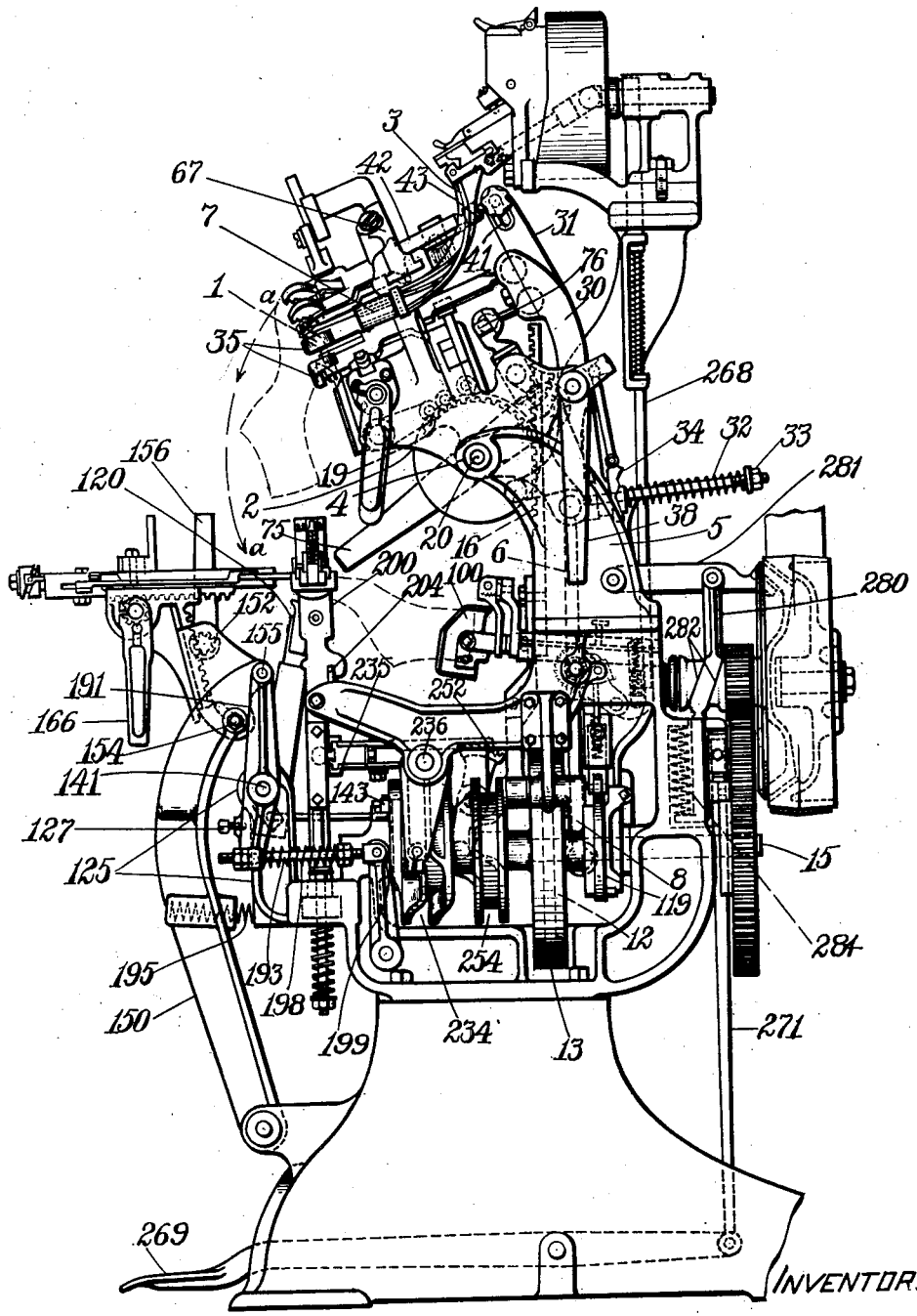

Fig. 11 is a view of the updraw lever mechanism as seen from the right hand side of Fig. 1.

Fig. 11ª is a plan view of the front gripper tripping slide.

Fig. 12 is a view of the brake and of the starting and stopping mechanism, partly in section, as seen from the right hand side of Fig. 1.

Fig. 13 is a detail view of one of the side lasting and tacking mechanisms illustrating the relation thereto of a portion of the pulling-over head which carries tack supplying tubes for delivering tacks to the side tacker mechanism at the same time that the pulled-over shoe is delivered to the lasting mechanism.

Fig. 14 is a detail of a gate which normally covers the lower ends of said tack supplying tubes and is automatically withdrawn as the tubes arrive at delivering position.

Figure 15:
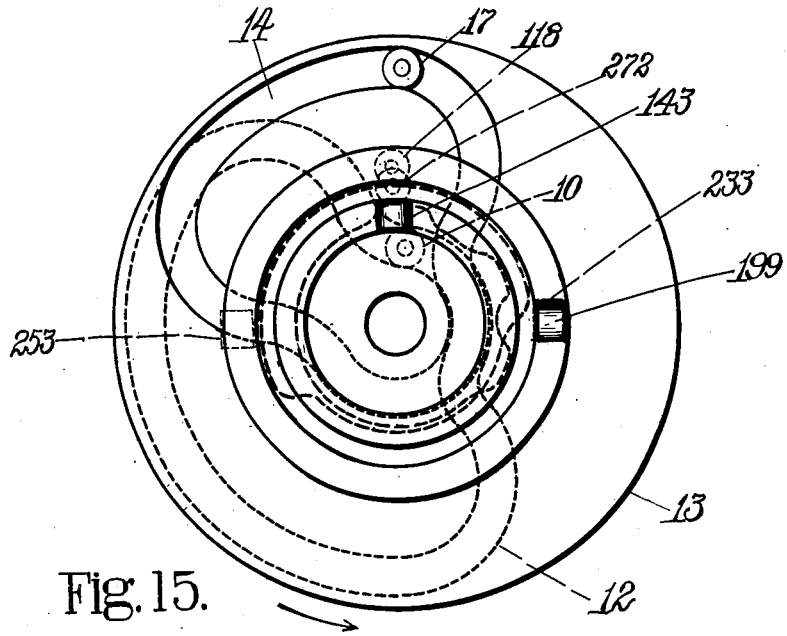

Fig. 15 is a front elevation of the cam mechanism shown in Figs. 1, 9 and 10, the cam rolls being shown in their starting or zero positions and the direction in which the cams turn being indicated by an arrow.

Figure 16:
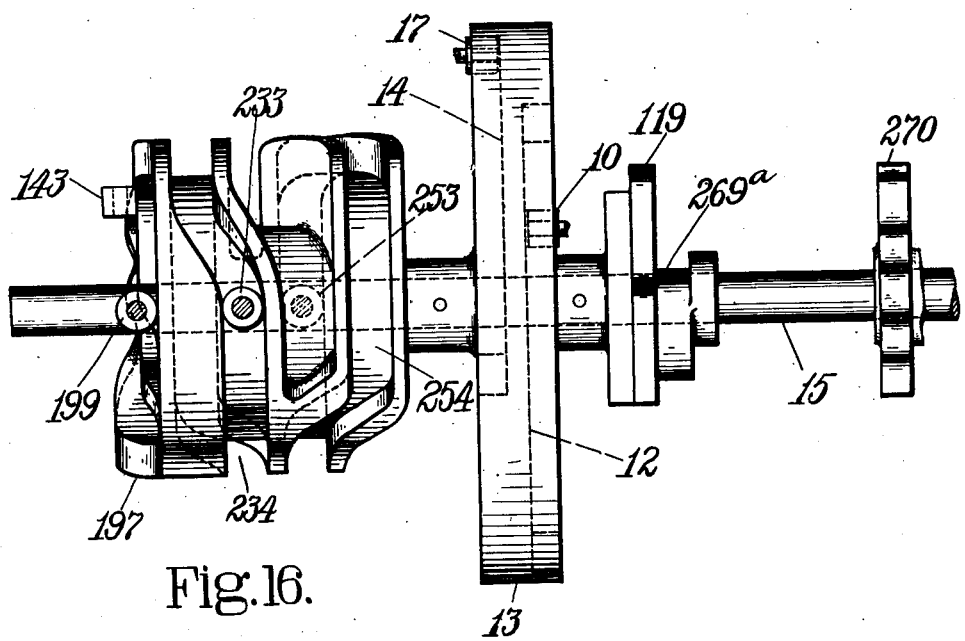

Fig. 16 is a right hand side elevation of the parts shown in Fig. 15.

Figure 2:
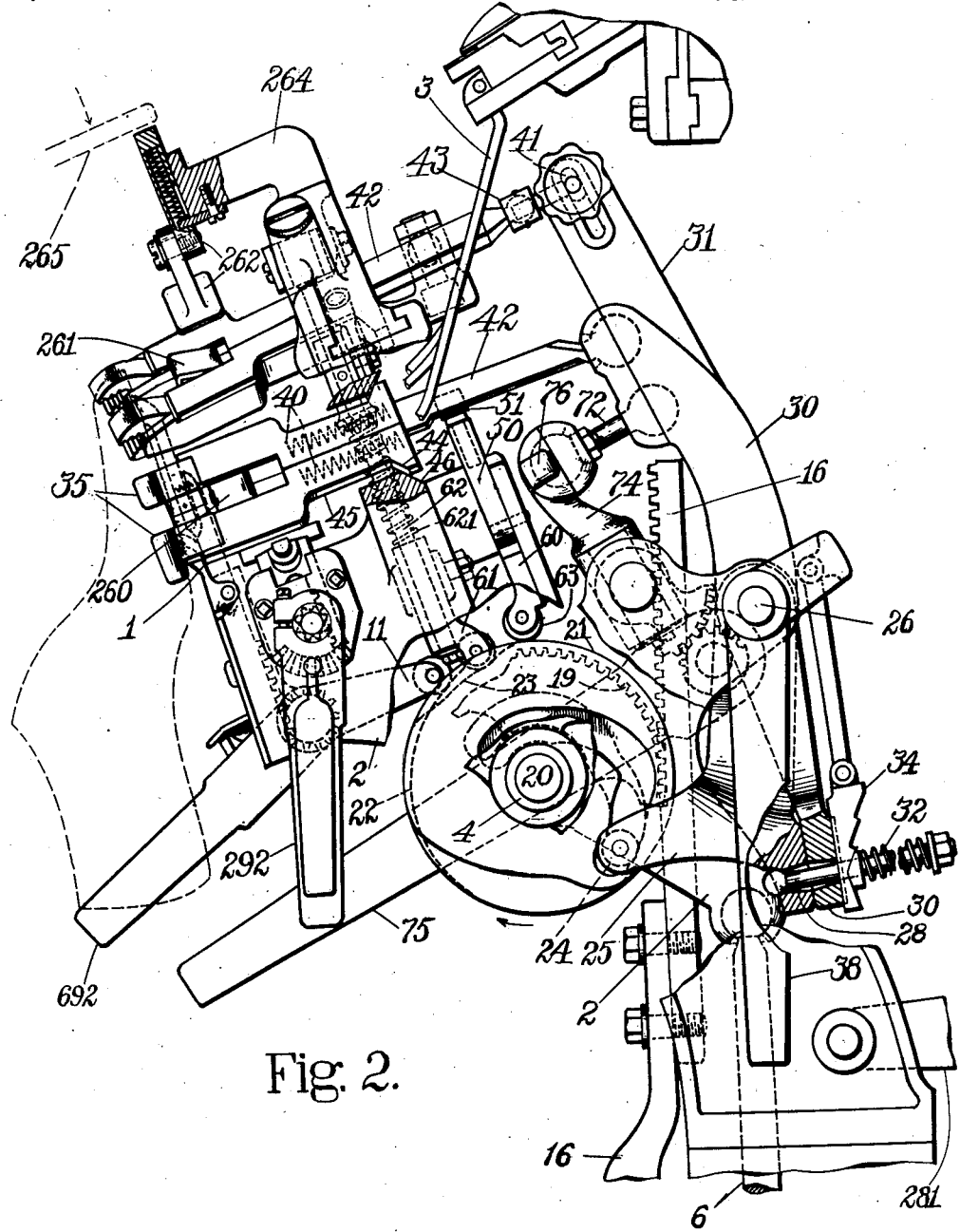
Fig. 2 is a similar elevation, partly in section and on a larger scale, of the upper portion of the machine, including the pulling-over mechanism.

The illustrated pulling-over mechanism, shown best in Figs. 1 and 2, comprises a sole rest 1 and a series of grippers arranged relatively to the sole rest, as shown in Fig. 4, to seize the upper along the sides and around the toe of a last, together with operating mechanism to move the grippers and sole rest relatively for pulling the upper, and adjusting mechanism for relatively moving the rest and grippers when necessary to secure a desired position of the pulled upper on the last. As shown in Figs. 1 and 2, the grippers are inclined downwardly toward the front of the machine, extending thus in substantially perpendicular relation to the plane of the forepart of the shoe bottom as the shoe is presented for the pulling-over operation. These parts are carried by the pulling-over head 2 which is mounted for shoe transferring movement in a vertical arc of approximately 90° about a horizontal transverse axis located in the center of a bearing 4 in the machine frame 5. This movement of the pulling-over head 2 is effected by a link 6 having a ball and socket connection at its upper end with the head and at its lower end with one end of a lever 8, Figs. 1, 9 and 10, that is fulcrumed at its other end to the machine frame and has a roll 10, Figs. 9, 10, 15 and 16, in a transfer cam track 12 in the rear face of a cam block 13 on the lower cam shaft 15, herein frequently termed the driving shaft, which extends longitudinally of the machine from front to back. In addition to the transfer cam track 12 the cam block 13 has a pulling cam track 14 in its front face. In this track stands a roll 17 on a segment lever 18, Fig. 9, that engages a rack bar 16. The upper portion of the rack bar 16 engages a segment rack 19 on the pulling-over cam shaft 20 in the center of which is the axis about which the pulling-over head is movable.

The movement of the pulling-over cam shaft 20 is an oscillation derived from the segment rack 19. This shaft 20 carries cam blocks 21, 22, 23, Figs. 3 and 2, of which 21 is the updraw cam for the side grippers. There is a face cam track in the left-hand side of the cam block 21 and in it runs a roll 24 carried by a rocker 25 the shape of which is shown in side elevation and plan view respectively in Figs. 2 and 11. The rocker is fulcrumed at 26 in the pulling-over head and has two downwardly extending forks in which are guide rods 28. These rods are each embraced by the lower end of an updraw lever 30 which is positively rocked outwardly by said rocker. The rods 28 are encircled by springs 32, confined thereon under tension between adjusting nuts 33 and wedge blocks 34 which rest on the levers 30. Through said springs the rocker 25 yieldingly moves the adjacent ends of the updraw levers 30 inwardly to effect yieldingly the pulling of the upper by the side grippers 35. The wedge blocks 34 are adjustable together to change the tension of both updraw springs 32 alike by link connections with the hub of a hand lever 38 fulcrumed at 26. The second cam block 22 has connections, which are similar to those just described, through a cam roll 37, Figs. 3 and 11, a rocker 39, a rod and a spring, with the updraw lever 31 for the toe grippers.

The updraw cam tracks for the rolls 37 and 24 have portions concentric with the axis of the cam blocks 21 and 22, see Fig. 2, and these portions are active during the same time as the portion of the transfer cam 12 which effects the movement of the pulling-over head 2 downwardly, and therefore the updraw cams 21 and 22 impart no motion to the updraw levers at such times but do maintain the upper under tension during the delivery of the shoe to the lasting mechanism. The relative movements of the updraw cams and of the swinging head are indicated by the respective cam paths 14 and 12 in Fig. 15, in which figure all of the cam rolls are shown in their starting or zero positions.

The grippers which have been found satisfactory, although others may be used, are constructed in substantial accordance with my prior United States Letters Patent No. 1,030,522 and comprise jaw closing springs 40, Fig. 2, which must be compressed during the opening of the jaws. This is effected, as fully explained in said patent, by forcing outwardly the gripper operating bars 42 after the gripper casings 45 have been arrested by engagement of shoulders 44 thereof with the front bracket 46 of the pulling-over head. This compression of the closing springs for the several grippers puts a substantial load on the cam shaft 15 and by bringing on this load at substantially the end of the upward swing of the pulling-over head the momentum of the moving head and the parts carried thereby is absorbed in compressing the closing springs.

The gripper mechanisms illustrated comprise eight pairs of gripper jaws arranged about the forepart of the shoe to engage the upper from near the shank on one side around the toe to near the shank on the second side of the shoe, it being contemplated that this machine shall prepare the entire shoe except the shank and the heel seat for the welt sewing, McKay sewing, or other permanent upper fastening operation.

Each of the illustrated side gripper mechanisms comprises two pairs of jaws, Figs. 2 and 4, which are controlled by a single operating bar 42 connected by a ball joint to the front end of one of the updraw levers 30. The toe gripper mechanism comprises relatively movable sections which include four pairs of jaws arranged to engage the upper around the toe. The operating bars for the gripper sections are connected through an equalizer 43 with a short bar which has a swinging connection with a block that is adjustable in a longitudinal slot 41 in the front end of the updraw lever 31. The construction and arrangement of these gripper mechanisms is similar, in the main, to that disclosed and claimed in my prior Patent No. 1,189,979, granted July 4, 1916, and need not be herein described in detail.

Figure 3:
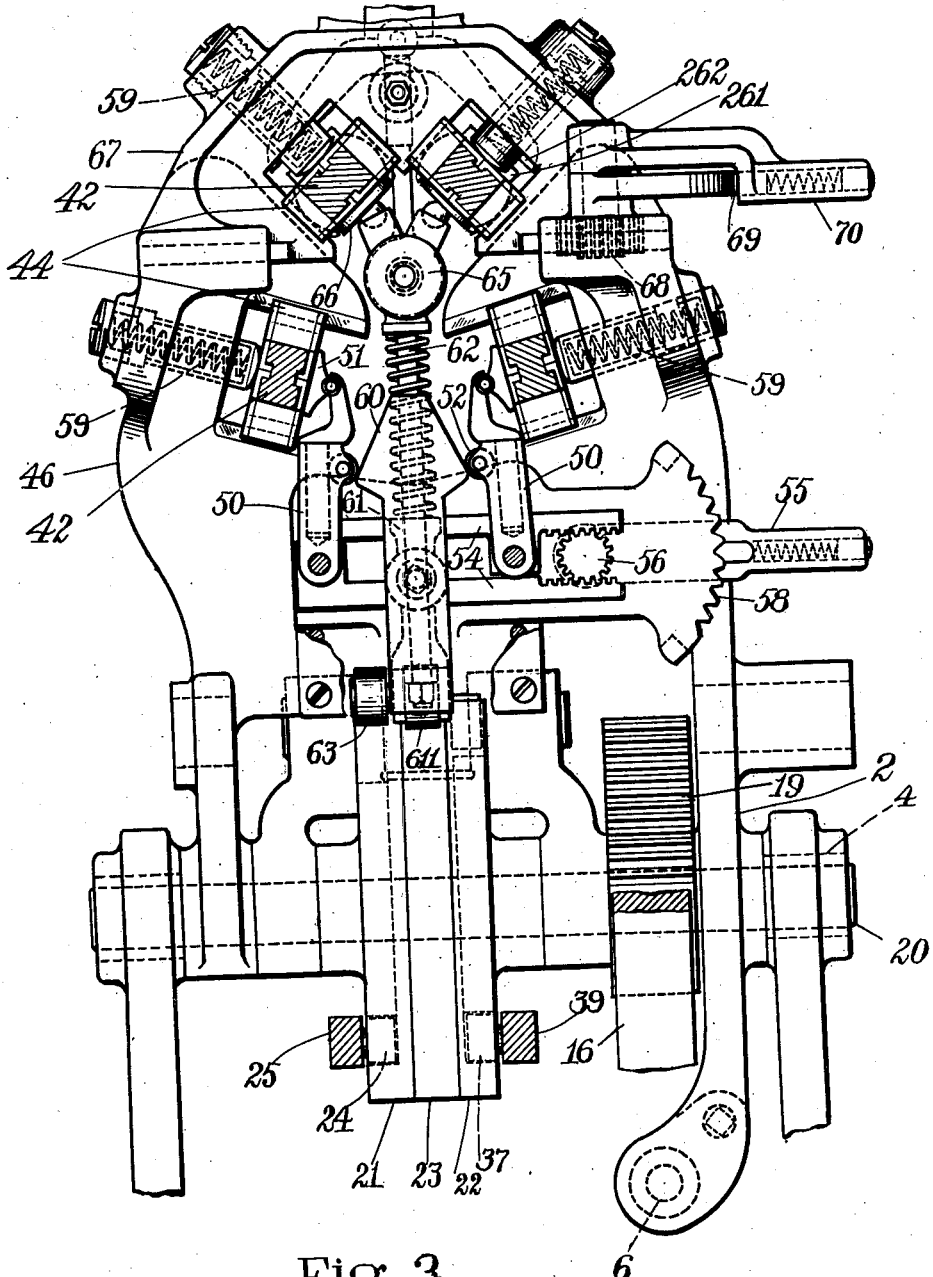
Fig. 3 is a section of Fig. 2 in a plane between the updraw levers and the gripper spreading mechanisms.

Adjustment of the side gripper mechanisms from and toward each other in guide bracket 46 of the head for different widths of shoes is effected by mechanism shown in Fig. 3 which comprises levers 50 carrying gripper pressure blocks 51 on their front ends and rolls 52 on their inner sides and having connections at their rear ends with oppositely faced rack slides 54 which engage a pinion 56 fast to an adjusting lever 55. The adjusting lever has a spring locking pawl to engage a stationary segment rack 58 and movement of the adjusting lever swings both levers 50 to adjust the side grippers simultaneously, the side grippers being held against the pressure blocks by stiff overdraw springs 59 located in the bracket 46. The rolls 52 are pressed by said springs 59 against the oppositely inclined faces of a wedge bar 60, Figs. 3 and 2, that carries on its rear end a roll 63 that is held against an edge of cam 21 by the pressure of overdraw springs 59 against the side grippers. The edge of cam 21 is formed to allow the wedge to move backwardly at the proper time to permit overdrawing of the pulled upper to be effected by said overdraw springs and said cam is formed to advance the wedge bar to spread the side grippers to their work-receiving position after the jaws have released the upper.

The toe grippers are also pressed, by springs 59, inwardly in their guides formed in bracket slide 67 that is adjustable transversely of the machine by a rack and pinion 68 and lever 70 having a locking pawl 69, Fig. 3, and their positions, see Figs. 4 and 5 for example, are determined by mechanism that includes a spreader bar 62 which is supported at its rear end in a slide 61, Fig. 2, and at its front end in a guide in slide 67, Fig. 3. The slide 61 has a roll 611 acted upon by a peripheral face of cam 23, and a spring 621 transmits the cam motion from the slide to a pressure head 65 that has radial pressure arms having ball and socket engagement with pressure blocks 66 that engage the operating bars 42 of the respective corner sections of the toe grippers as clearly shown in Fig. 3. The spring 621 is stiffer than springs 59 but it is normally not under compression and the shoe receiving position of the toe grippers is that shown in Fig. 4. When the cam 23 is turned from the position shown in Fig. 3 the spring 621 transmits the motion yieldingly to pressure head 65 which, through its radial arms, effects spreading of the toe grippers to the relation shown in Fig. 5. The described arrangement permits freedom of movement of the toe grippers to enable them to adapt themselves automatically to different shapes of lasts, the adjustment of slide 67 by lever 70 locating said grippers for right and left lasts when necessary.

The toe gripper mechanism occupies a substantially constant normal shoe receiving position lengthwise of the machine for all lengths of shoes, the heel end of the shoe varying in position as different lengths of shoes are presented. For such adjustment of the toe gripper mechanism longitudinally of the machine as may be needed in setting up the machine, or to meet conditions encountered, the slot in the upper end of the toe gripper updraw lever 31 suffices. In making this adjustment the toe gripper mechanism fulcrums on the pressure blocks 66 and thereby throws the jaws out and in.

Manual adjustment of the updrawing tension of the side grippers is provided for by a hand lever 75 the hub of which has toothed engagement with the rear end of a rocker 74 connected to the levers 30 by an equalizer 76 and links 72.

The equalizing bar 76, which is connected to the updraw levers of both side gripper mechanisms, is extended toward one lateral side of the machine as a hand lever, Figs. 2 and 5, by which to raise one side gripper mechanism and simultaneously to depress the other one to adjust the upper transversely about the last for properly locating the throat or lace opening of the shoe. A tip straightening mechanism substantially like that in the machines of my prior United States Letters Patent No. 1,029,387, and operated by hand lever 292 is provided for simultaneously advancing one side gripper and retracting the other one to adjust the upper longitudinally about the last for properly positioning the tip seam. The sole rest 1 is operated by a peripheral face of cam 22, Fig. 2, with which engages a lever 11 on the sole rest rocker to produce movements like those in the machine of my prior United States Letters Patent No. 1,029,387, and a hand lever 692 is employed to move and manually adjust the sole rest longitudinally of the shoe. These mechanisms by which to effect such adjustments of the work in the pulling-over mechanism as may be found necessary, if any, are or may be constructed and operated substantially as is now well understood in practical use of pulling-over machines and as fully disclosed in said prior patents, and a detailed description thereof is therefore not necessary herein and is omitted in the interest of brevity and conciseness.

It is herein contemplated that the pulled-over shoe shall be delivered under tension, without preliminary fastening, to the lasting mechanism for which the pulling-over operation has prepared the shoe. In the illustrated organization the pulling-over mechanism has a movement, produced by the cam 12 and described connections, to transfer the shoe to the lasting mechanism, although it is obvious that in the broad aspect of this invention the lasting mechanism might be operated to come and take the shoe from the pulling-over mechanism, or that the transfer of the shoe could be effected by mechanism independent of the pulling-over and the lasting mechanisms.

The shoe resting means associated with the lasting mechanism and into which the pulled-over shoe is herein shown as delivered by that movement of the pulling-over head about axis 4 which is effected by transfer cam 12, lever 8 and bar 6, comprises a heel rest or abutment, Figs. 1, 6 and 7, to hold the shoe against rearward displacement by the operation of the toe embracing wipers, and a toe rest or support, Figs. 1, 7 and 9, to sustain the forepart of the shoe against the downward pressure of the wipers on the shoe bottom. The heel rest 100 faces forwardly and is suspended by parallel links 104 which permit it to swing laterally to adapt its position to that of the shoe which is presented to it. The links can also swing backwardly a little against resistance of a spring 103, Fig. 7, and the rest has a serrated bar 105 on its back face that is adapted to engage a laterally stationary locking plate 106 to hold the heel rest against lateral displacement after it has been adjusted laterally by the shoe. In these respects the heel rest is like that more fully shown and described in my said Patent No. 1,029,387.

The heel rest is supported by a sliding rack bar 110 and is normally held pressed forwardly by pinion 113 and segment 111 operated by a spring 112. As the shoe is moved downwardly and backwardly into lasting position it engages the heel rest, and having shifted the rest laterally to adapt it to the lateral position of the heel end of the shoe, pushes the rest rearwardly, first overcoming spring 103 and locking plates 105 and 106 together and then sliding bar 110 toward the right in Figs. 1 and 7.

At the proper time in relation to other movements which will be described, and prior to the advance of the toe wipers over the shoe, the heel rest is given a short forward impulse and is locked to hold the shoe rigidly against rearward displacement by the toe lasting mechanism. For this purpose the pinion 113 carries a ratchet disk 114 with which engages a pawl 115 that is mounted on a rotary carrier, Fig. 8, operated by a plunger 116 that is lifted by the engagement of a roll 118 with an edge face of cam block 119, Figs. 1, 7 and 16. An adjustable controller 117 for pawl 115 determines the portion of the pawl's throw which shall be effective on the ratchet 114.

The toe rest, Figs. 1, 7 and 9, comprises a post 120 yieldingly upheld in a sleeve 124 by a spring 126. The sleeve is pivotally mounted on a transverse axis in trunnions of a base frame bracket 125 and is normally tipped about said axis so that it inclines backwardly and upwardly, the extent of inclination being regulated by a stop screw 127. The post pivotally supports on a common axis two levers 130, Fig. 9, which carry pressure blocks 132. A spring 134 located between the lower arms of the levers holds them in such relation that the pressure blocks are normally together or in close proximity and when the shoe is forced down upon the pressure blocks the levers automatically turn toward the relative position shown in Fig. 9, the pressure blocks moving apart and acting by friction to stretch the stock while pressing it into firm engagement with the last. The levers 130 can move together about their fulcrum for adaptation to irregularities in thickness of right and left lasts at the inner and outer sides. A centering blade 135 insures an upright position of the levers when the blocks 132 are brought together by spring 134. Certain features of this toe rest mechanism are protected by the claims of prior United States Letters Patent No. 1,249,185 granted on December 4, 1917 upon an application of Angelo Perri.

After the shoe has been carried by the pulling-over mechanism down to its final position, which is determined by the transfer cam 12, the toe rest is positively lifted for finally stretching the upper laterally and for rigidly clamping the shoe against the sole rest. For this purpose the post has rack teeth, Fig. 7, which mesh with a pinion 140 on the axle on which the post sleeve is supported in bracket 125. The axle supports a ratchet disk 142 which is engaged by a pawl 144, Fig. 7, operated by a rod 145 having connection with a roll 143, Figs. 7 and 16 that is operated by an end face of a cam block 197. A ratchet shield 146 is arranged adjacent to the disk 142 and is adjustable to determine the part of the stroke of the pawl during which it shall engage the ratchet. The shield 146 is shown as rigid with a split sleeve 147, Fig. 9, that is adjustably secured on the axle by a taper screw 148 that is threaded into a split left hand end portion of the axle.

The lasting mechanism illustrated for operating on the shoe in the lasting position comprises toe embracing wipers and side wipers and tackers. The toe lasting wipers, Figs. 1 and 7, are carried on an upright swinging arm 150 which is pivoted at its lower end to the machine base and supports on its upper end a head piece 152 which is angularly adjustable about a pivot 155 to locate the wipers in parallelism with the lengthwise inclination or pitch of the last bottom. This adjustment is made secure by a binding screw 154 operating in a segmental slot. The head piece 152 has in its front face a guideway to receive a toothed guide rib on the rear face of the wiper carriage 160, and in the head is journaled a shaft 158 carrying a rack-engaging pinion and an operating lever 156 to move the wipers up and down. There is a locking pawl 157 on the lever 156 to maintain the vertical position of the wipers.

The wiper carriage has a guideway in its top face in which a wiper slide 165 is movable longitudinally of the shoe by means of rack teeth formed on a bar 170 that transmits motion to the wiper slide 165 through a spring 172. The rack bar is engaged by a pinion on a shaft 168 which also carries an operating lever 166. There is a locking pawl 171 in the lever 166 and there is a circular ratchet face on the carriage to be engaged by the pawl. The levers 156, 166 and their locking pawls are employed in the first instance to adjust and hold the wipers for the presentation of the shoe to the wipers and during the automatic operation of the wipers which will shortly be described, and it is not contemplated that any manual operation of the wipers by these levers will ordinarily be required.

The construction of the wipers is no part of the present invention, the same being broadly like the wipers which form the subject-matter of my prior Letters Patent No. 1,135,949. Having reference to Figs. 6 and 7, the wipers shown comprise a back plate 175 that is freely movable transversely in the wiper slide 165 between the rolls 176, 176 and a pin 178 the reduced end of which fits into a groove in the back plate. The toe end wiper plate 180 is pivoted back from its edge to the back plate and the corner wiper plates 182, which are broadly triangular in shape, are pivoted at their adjacent corners to the toe end wiper plate. The outer corners of the plates 182 are connected by thrust bars 185 to an equalizer 186 fulcrumed on the rack bar 170.

The wiper organization described is such that the wiper mechanism can be adjusted by hand levers 156, 166 to receive the shoe as the latter is moved downwardly in an arc (for example the arc a—a, Fig. 1).

The location of the toe of the shoe longitudinally in the machine has been predetermined with reasonable accuracy by using the toe grippers as a gage or toe end abutment when putting the shoe into the pulling-over mechanism so that the correct longitudinal position of the wipers to receive the shoe can be obtained for causing the upper to be wiped up the end face of the toe as the shoe is moved down into the wipers. The transversely sliding back plate 175 permits the wipers to adjust themselves laterally for right and left toes and the spring 172 allows the wipers to be pushed outwardly at the center and thereby closed around the sides of the toe as the toe is forced downwardly through the wipers. The shoe has a component of motion backwardly or toward the heel (see arc a—a) as it passes through the wipers, thereby producing a forward wipe up the sides of the toe. The transfer cam 12 effecting the movement of the shoe is formed to give the shoe short reciprocations down and up in the wipers. These reciprocations are so short that the irregularity of the cam path 12 to produce them cannot be shown on Fig. 15. As herein contemplated the shoe is depressed in the wipers to effect a wiping up of the upper nearly but not quite to the plane of the shoe bottom and then the shoe is raised to about the elevation at which it first engaged the wipers. Thereafter the shoe is again depressed to effect a second wiping up and then a third before wiping inwardly over the edge of the innersole. The final depression is extended to carry the shoe below the wipers far enough so that the wipers can start to close over the shoe bottom sufficiently above the top face of the innersole feather to avoid curling up the edge of the feather. Then as the wipers complete their closing movement the shoe is raised with the result that the wipers can drive the upper obliquely downwardly and inwardly into the angle between the feather and the channel lip of a welt shoe innersole. This downward and inward drive is preferably repeated twice and the last drive is synchronous with the locking and unyielding lifting of the toe rest so that the ironing down pressure is greatest the last time it is applied.

The altitude of the shoe is determined at all times by the shoe rest 1, as controlled by the cams 22 and 12, and this applies to the altitudes to which the shoe is moved during the action of the wipers on the upper. The sole rest herein shown has a three-point bearing on the forepart of the shoe bottom and the shoe is clamped against said three points of the sole rest by the action of the grippers on the upper, the heel end of the shoe being free at the time; therefore the sole rest predetermines the angular position of the forepart of the shoe bottom over which the wipers are to close, both as to transverse and longitudinal inclination. This provides automatically for the wipers to obtain a substantially uniform bearing on the bottoms of different shoes at both sides of the toe and throughout the length of the wipers, and adjustment of the wipers is rarely required.

The position of the toe wiper mechanism longitudinally of the machine is determined by connections with the cam mechanism. Referring to Fig. 1, a lever 191 is connected to the wiper carrying arm 150 at 155 and is fulcrumed on the axle 141. The lower end of the lever is connected by a rod 193 with the upper end of a swinging arm that carries a roll 199 to engage a cam face on the end of cam block 197. A spring 195 located between the frame and the arm 150 presses the arm outwardly and thereby holds the lower arm of lever 191 inwardly and the roll against its cam face so that the contour of the cam face determines the shoe receiving position of the wipers, and later effects the movements thereof to wipe the upper inwardly over the shoe bottom.

From the description of the organization of the wiper mechanism it will have been understood that the wiper plates stand normally open with the toe end wiper plate 180 pressed rearwardly, or toward the heel of the shoe, by spring 172, Figs. 6 and 7. As the descending shoe engages said end plate it moves it forwardly, the spring 172 yielding, and this movement carries the adjacent ends of the corner wiper plates 182 forwardly, causing them to fulcrum on the thrust bars 185 and therefore to close against the sides of the toe, as will be apparent from Fig. 6. If the wipers should be set too close to the path of the shoe, as by lever 166, injury is avoided by the relief spring 198 that is interposed between the wiper operating lever 191 and its cam roll 199 and allows the wiper mechanism to yield outwardly. When the shoe has been depressed one or more times as described to wipe up the upper and bring the plane of the shoe bottom low enough so that the wipers can close over it, the spring 172 reacts and instantly advances the toe end wiper plate to wipe over the end of the toe. The cam 197 is timed to effect, immediately, an advance of the wiper mechanism and cause the thrust bars 185 to turn the corner wipers to wipe over the sides of the toe.

The described operation of the wipers to embrace the toe automatically in response to engagement of the shoe with the end wiper plate 180 as the shoe is depressed and to close over the toe may be and preferably is supplemented by repeated reciprocations of the wipers toward and from the shoe and finally over the shoe. With the construction of wiper plates herein shown this will produce repeated pressure impulses by the end wiper 180 against the upper and the innersole lip at the end of the toe of a welt shoe, and reciprocations of the corner wiper plates 182 out and in over the work at the corners and sides of the toe. In practice it is the corners and the sides of a toe that are the most liable to present difficulties in smoothly and tightly lasting the upper and in seating it firmly against the lip of the innersole as set forth at length in prior Letters Patent No. 958,291. The present invention, herein shown as embodied by way of example in the described organization, is particularly well adapted for dealing automatically with this situation and is an important advance in the art over the manually manipulated apparatus of said patent.

Certain combinations here embodied in toe lasting mechanism and constituting a part of this invention are also applicable to heel lasting mechanism and where the context and the state of the art permit the expression "toe lasting mechanism" in the claims should be interpreted generically to cover mechanism for lasting either end of a shoe.

In addition to the toe wipers the lasting mechanisms include means for wiping the upper over the sides of the shoe bottom and for fastening it in side lasted position by the insertion of tacks. The side lasters, of which there are two located at opposite sides of the machine, are shown in Figs. 1, 7 and 9 and reference will also be made to Fig. 10. Both side lasters are alike and a description of one will apply to the other. Referring to the side laster which is shown in side elevation in Fig. 1 and in front elevation at the right side of Fig. 9, it comprises an arm 200 mounted to swing in and out in a bearing 202 in the base frame of the machine. The upper portion of the arm is guided on a frame rib 204 and on its end is swiveled a side laster head 205 to turn about an upright axis to permit the laster to adapt itself automatically to the longitudinal inclination of the side of the last upon which the laster acts.

The side laster head 205 has guides 206, 208, Fig. 13, between which the forked outer portion of a wiper 210 is mounted with capacity to slide endwise and to rock vertically. The forked arms of the wiper embrace the head 205 and are upturned to form an incline resting on a roll 215. The roll is mounted on a spring plunger 216 that is guided on the outer side of head 205 and which, by means of said roll and incline, holds the wiper normally pressed inwardly with its beveled inner end depressed. As the side laster is advanced toward the shoe the beveled inner end of the wiper engages the upper and frictionally forces it inwardly over the feather of the inner sole, the beveled end facilitating the movement over the edge of the shoe and the yielding mounting of roll 215 permitting the wiper to rock vertically to adapt itself to such differences as are encountered in the planes which the acting end of the wiper must assume in doing its work.

Each side laster carries a tacker, which is shown as comprising a tack block 220 that is rigidly attached to the side laster head 205 and has a plurality of tack pockets provided with tack fingers, not shown, to adapt them to hold tacks delivered through swinging conductors 222, Fig. 13. Tack drivers 224, Figs. 7, 9 and 13, are carried by the inwardly extended end of a driver bar 225 that is mounted for endwise movement in the swiveled side laster head 205 and for turning movement with that head. The flanged lower end of bar 225 is engaged by an inwardly extending fork, Fig. 9, on the upper end of a driver slide 227 that is guided in the arm 200, extends through the bearing 202 and terminates in a rod that carries a tack driving spring 230 held under compression between said bearing and a nut on the end of the rod. The rod is threaded to carry an adjustable stop 232 that is adapted to engage the upper side of bearing 202 and limit the descent of the drivers so that they will fully insert the side lasting tacks or, alternatively, will leave them upstanding for withdrawal as required for welt work. In the latter case the wiper and the tack block will be slotted at their inner ends to permit outward movement without disturbing the tacks.

The drivers are lifted and the springs 230 put under tension by an angle lever 235, Figs. 1, 9 and 10, a depending arm of which has a roll 233 running in a cam track 234. The lever is fulcrumed at 236 and its horizontal arm is broadened into a plate which carries slides 238, Fig. 10, on its front edge. Each slide has a portion adapted to engage under a shoulder 240 on the driver slide 227 for lifting the drivers.

The side lasters are operated inwardly over the shoe bottom and the drivers are tripped at the proper time by connections acting through the slides 238, said connections yielding to permit movement of the slides relatively to the lasters and tripping of the drivers only when the lasters have completed their movement and been arrested. For arresting the side lasters each one carries a gage 242, shown in Fig. 9 as formed on the inner end of wiper shelf 206, which is made endwise adjustable to provide the desired distance between the tacks and the edge of the shoe. For permitting relative movement between the driver tripping slide 238 and its operating connections the slide carries a spring plunger 245, Fig. 10, that has an inclined face opposed to an end face of a bar 246 which is secured to the side laster arm 200. The rear face of the tripping slide has rack teeth that are engaged by a segment gear 248 operated by a rack slide 250 the lower toothed face of which has engagement with the left-hand toothed portion of rock-shaft 237, Fig. 10. This shaft is oscillated by the engagement of teeth on its right-hand end, Fig. 10, with a rack that is driven by a lever 252, Figs. 1 and 10, having a roll 253 running in a track in cam 254, Figs. 1 and 10. This line of connections operates to draw the side lasters inwardly over the shoe bottom with wipers 210 in hard rubbing engagement with the upper, arrest each of the side lasters with the tack drivers at the selected distance from the edge of the shoe, apply clamping pressure through the gages 242 against the sides of the shoe until the spring plungers 245 yield, then withdraw the slides 238 from under the shoulders 240 of the driver slides, whereupon the driver springs 230 act to insert tacks to fasten the sides of the upper in lasted position. After the insertion of the tacks the lever 235 is rocked by its cam 234 to lower its front end to a level at which the tripping slides 238 can reëngage shoulders 240 of the driver bars whereupon the slides 238 are moved by cam 254 to effect such reëngagement and the lever 235 is then reversely rocked to raise the drivers and tension the driver springs 230.

The tacks for the side lasters and tackers are supplied from a well-known hopper separating mechanism operated by an eccentric 269ª (Fig. 16) and connection 268 shown in Fig. 1 and is mounted on a frame independently of the swinging pulling-over head 2. Tubes 3 convey the tacks to holders 7, Figs. 1 and 13, on the pulling-over head 2 and when the head swings down to shoe delivering position the holders are moved into alinement, Fig. 13, with the tack conductors 222. A swinging gate 221 on the lower end of holder 7 is held in normal position by a spring and is withdrawn automatically by engagement with a projection 223, Fig. 14, from the tack conductor.

The pulling-over head remains in its shoe delivering position only long enough to permit the shoe position controlling means and the lasting mechanism to assume control of the pulled-over shoe. The sole rest forces the shoe downwardly through the toe wipers and holds it until the toe wipers close and until the side lasters close, during which latter movement the side gripper tripping devices 260 Fig. 2, are operated, by engagement of the side laster heads therewith in known manner, to release the side grippers from the upper. The toe grippers are released in a similar manner by the engagement, with their tripping devices 261, Figs. 1, 2 and 11ᵃ, of a tripping slide 262. The slide is movably mounted in a carrier 264 extended forwardly from the front bracket 67, the slide being held normally outward by a spring with its forked inner end out of touch with the tripping devices. For operating the tripping slide the wiper slide 165 of the lasting mechanism adjustably carries a finger 265, Figs. 1 and 7, into the path of which slide 262 is moved when the pulling-over head transfers the shoe to the lasting mechanism. This finger is caused to contact with the outer end of the tripping slide when the wipers are closing over the shoe bottom and automatically release the toe grippers from the upper in time to allow the upper to be freely pressed by the wipers into the angle between the feather and the channel lip of a welt shoe as represented in Fig. 7 which shows the position in which the machine comes to rest.

If the automatically effected lasting is not satisfactory to the operative of the machine he can now perfect it in any of the ways in which it is customary for bed lasting machine operatives to manipulate the upper by the use of the wipers and even by the use of hand pincers if circumstances should require that in a particular case. The expression "shoe position controlling means" as used herein and in the claims is to be interpreted broadly to cover any shoe positioning locating or holding means which, in the combination contemplated in any claim, will serve the function required to make an operative mechanism.

The upper may be fastened in lasted position around the toe in any suitable way as by tacking in McKay work or binding from one side laster tack around the toe to another tack in welt work.

The operating mechanism of the machine is controlled by a treadle 269, Fig. 1, which transmits motion through a rod 271, the upper end of which is beveled, see Fig. 12, to a finger carrier 273, the pivoted finger of which abuts against and moves a tripping slide 275. The tripping slide is carried in a vertically movable brake slide 280 which extends upwardly, see Figs. 1 and 12, to the brake lever 281. The brake slide also has inclined faces 282 adapted to open and close a friction clutch that connects the loose driving pulley, Fig. 1, on the power shaft with speed reducing gearing running to the driving shaft 15 and comprising a comparatively small gear on the power shaft and a larger gear on the driving shaft. The lower portion of the slide 280 is recessed to receive a slide depressing spring 284 and a movable block 285 that carries a roll 272 for engagement with the brake cam 270 and also carries a wear plate 286 adapted to have lifting engagement with a depending lug of the tripping slide 275.

The arrangement of the described parts is such that a projection on the brake cam operates through block 285, wear plate 286 and tripping slide 275 to raise the brake slide against the resistance of its spring 284 and open the clutch and apply the brake. This is the position of the parts shown in the drawings. When the tripping slide is moved to the left by depression of treadle 269, spring 284 is allowed to move the slide 280 downwardly to withdraw the brake and close the clutch. As soon as the brake cam has turned far enough to present a low portion to the roll 272 the block 285 descends and allows a return spring to restore the tripping slide 275 to the position shown in Fig. 12. When a high portion of the brake cam again lifts the block 280 the brake slide is once more lifted through the tripping device to open the clutch and apply the brake.

In use of the machine a shoe is positioned with its bottom face against the sole rest, its toe higher than the heel and pointing upwardly, this posture of the shoe being found an advantageous one in which to carry on the pulling-over operation. As shown the location of the shoe is such that the operative, standing in normal working position in front of the machine, can look at the upper face of the shoe and ascertain that the lines of the upper are correctly positioned with relation to the last during the pulling-over operation. The pulling-over operation which follows the first treadling of the machine is performed by the illustrated mechanism in a manner which has been sufficiently set forth in connection with the foregoing description of the mechanism in view of the well-known general character of the pulling-over mechanism of this machine. The pulling-over operation leaves the upper taut over the top face of the last and the margin of the upper outdrawn and updrawn around the toe so that it is free or substantially free from wrinkles.

Another treadling of the machine causes the pulled-over shoe to be transferred to the lasting mechanism and causes that mechanism to assume control of the shoe and to do its work on the shoe. The transfer of the shoe involves a shift of position or posture of the shoe, by changing its angular presentation so that its sole face is uppermost for the lasting operation, and a change of location of the shoe to a lower altitude. This is effected by turning the shoe about a horizontal axis extending laterally of the shoe whereby the toe end of the shoe is swung toward the operative and downwardly toward position to enter the toe lasting mechanism, which occupies a position between the general vertical plane of the operative's body and a parallel plane extending through the pulling-over mechanism. As herein shown the toe lasting mechanism is directly between the operative's body and the pulling-over mechanism and the operative therefore faces the toe end of the shoe. If manually-operated toe lasting mechanism were to be substituted for the present automatic mechanism, the operative should stand in the customary bed-lasting-machine relation at the side of the shoe, which would involve a further positioning movement of the shoe about a vertical axis to present the side of the shoe to the operative and in that case the toe lasting mechanism would be located at one side of a line directly connecting the operative's body and the pulling-over mechanism.

In the illustrated machine I am enabled to move the shoe directly into the lasting mechanism and to operate that mechanism automatically by locating the shoe longitudinally against the toe gripper when the shoe is put into the pulling-over mechanism and by shifting the shoe between its successive postures without detachment from the machine by the aid of the sole rest as a shoe position controlling means to coöperate with the lasting mechanism as well as with the pulling-over mechanism.

As the shoe is depressed into the toe lasting mechanism the wipers embrace the toe below the sole line and wipe the tensioned upper into smooth contact with the last around the toe as the last descends so that there is no opportunity for wrinkles to form. The front grippers hold the upper outdrawn over the wipers in accordance with the invention claimed in my prior Patent No. 1,135,953, during the operation of the wipers and when the wipers are advanced over the shoe bottom the engagement of abutment 265 with the tripping slide 262 releases the toe grippers. When the shoe has been depressed to lasting position the side lasters close over the sides of the shoe releasing the side grippers whereupon the pulling-over mechanism returns automatically to pulling-over position to operate upon another shoe while the lasted shoe "sets" in lasted position. The side tackers fasten the upper at the sides of the ball.

The retirement of the pulling-over mechanism gives clearance above the shoe, as shown in Fig. 7, for the operative to examine the shoe and ascertain that the automatically effected lasting operation has left the shoe in satisfactory condition. If it has not he has every needed opportunity to perfect the operation manually, by the use of hand pincers if necessary, in addition to hand manipulation of the wipers. Also the operative can conveniently bind the toe with wire if desired and, in the case of McKay shoes, can employ the usual tacks to fasten the overlasted upper permanently to the innersole.

While the shoe is setting in the lasting mechanism the operative positions another shoe in the pulling-over mechanism, treadles the machine to cause the power to effect the pulling-over operation and then inspects the pulled-over shoe. It is thereafter that treadling of the machine frees the lasted shoe, the pulling-over mechanism standing at rest during this portion of the machine's cycle with a shoe held under tension to stretch gradually. In normal use, it will be understood, the first treadling pulls-over a shoe while the lasting mechanism stands at rest with a previously pulled-over shoe setting in it, the second treadling frees the previously pulled-over and lasted shoe from the lasting mechanism, and the third treadling carries the shoe that is in the pulling-over mechanism into the lasting mechanism and causes the lasting mechanism to do its work and the pulling-over mechanism to return to position to operate on another shoe.

Having described the invention, I claim as new and desire to secure by Letters Patent of the United States:—

1. A shoemaking machine having, in combination, pulling-over mechanism arranged to pull-over a shoe in a position appropriate for the performance of that operation; lasting mechanism arranged to last an end portion of the shoe when the bottom of the shoe is in a position, including a materially lower altitude than that of the pulling-over position, which is advantageous for carrying out the lasting operation; and operating means for said two mechanisms, said machine being organized to enable said mechanisms to operate successively on the same shoe.

2. A shoemaking machine having, in combination, pulling-over mechanism arranged to pull-over a shoe in a position in which the operative can look substantially horizontally at the upper face of the forepart of the shoe; and lasting mechanism arranged to last the toe end of the pulled-over shoe in a position in which the same operative can, without materially changing his position, look more nearly downwardly upon the sole face of the shoe.

3. A shoemaking machine having, in combination, pulling-over mechanism arranged to pull-over a shoe in a position with its toe end pointing upwardly and the upper face of the forepart of the shoe toward the operative where the lines of the upper are observable by the operative; and lasting mechanism arranged to last an end portion of the shoe with the toe end pointing substantially horizontally toward the operative and its sole face uppermost.

4. A shoemaking machine having, in combination, pulling-over mechanism arranged to pull-over a shoe in a position appropriate for the performance of that operation; lasting mechanism arranged to last an end portion of the shoe when the shoe is in a position, including a materially lower altitude for the bottom of the shoe than that of the pulling-over position, which is advantageous for carrying on the lasting operation; and operating mechanism including means to effect transfer of the shoe from the pulling-over position to the lasting position.

5. A shoemaking machine having, in combination, pulling-over mechanism arranged to pull-over a shoe in a position appropriate for the performance of that operation; and lasting mechanism arranged to last an end portion of the shoe when the shoe is in a position, including a different altitude from that of the pulling-over position, which is advantageous for carrying on the lasting operation, said machine being organized to permit the pulling-over of one shoe while another shoe is being lasted and to transfer the pulled-over shoe with the upper under tension from the pulling-over position to the lasting position.

6. A shoemaking machine having, in combination, pulling-over mechanism arranged to pull-over a shoe in a position appropriate for the performance of that operation; and lasting mechanism arranged to last an end portion of the shoe when the shoe is in a position, including a different altitude from that of the pulling-over position, which is advantageous for carrying on the lasting operation, said machine being organized to permit the pulling-over of one shoe while another shoe is being lasted.

7. A shoemaking machine having, in combination, pulling-over mechanism arranged to pull-over a shoe in a position appropriate for the performance of that operation, and lasting mechanism arranged to last an end portion of the shoe when the shoe is in a lower position which is advantageous for carrying on the lasting operation, said machine being organized to deliver the pulled-over shoe to the lasting mechanism with the upper held under tension.

8. A shoemaking machine having, in combination, pulling-over mechanism arranged to pull-over a shoe in a position in which the operator can look at the upper face of the forepart of the shoe while in his normal working position, lasting mechanism arranged to operate on the shoe when it is positioned sole face upward where the operator can view the bottom of the shoe in his normal working position, and means movable to carry the shoe about an axis extending laterally of the shoe in shifting the shoe between pulling-over and lasting positions.

9. A shoemaking machine having, in combination, pulling-over mechanism, lasting mechanism, and shoe positioning means arranged to locate the shoe for the operation of the pulling-over mechanism and mounted to turn the pulled-over shoe about a horizontal axis extending laterally of the shoe for presenting the pulled-over shoe sole face upward for lasting.

10. A shoemaking machine having, in combination, pulling-over mechanism arranged to pull-over a shoe in a position in which the operative can look at the upper face of the forepart of the shoe while in his normal working position lasting mechanism arranged to operate on the shoe when it is positioned sole face upward, and a sole rest movable with the shoe from pulling-over position to lasting position and mounted to turn with the pulled-over shoe about a horizontal axis extending laterally of the shoe.

11. A shoemaking machine organized for pulling-over a shoe in a position appropriate for the performance of that operation and for an end portion of the shoe to be lasted when the shoe is in a lower position and sole face upward, said machine having a sole rest and means which coöperate therewith to hold the upper under tension during transfer to lasting position, said rest and cooperating means being mounted to turn together about an axis extending laterally of the shoe to effect movement of the pulled-over shoe to lasting position.

12. A shoemaking machine having, in combination, pulling-over mechanism which includes grippers and a sole rest arranged to pull-over a shoe with its toe end higher than its heel and its top face toward the operative, a toe lasting mechanism located at a lower level than the grippers and nearer to the operative than the grippers, and mountings for the sole rest permitting movement thereof with the pulled-over shoe in effecting transfer of the shoe from pulling-over position to lasting position.

13. A shoemaking machine having, in combination, a toe lasting mechanism, a pulling-over mechanism arranged to engage a shoe at points above and to the rear of the lasting mechanism, and a sole rest arranged to resist the pull of the pulling-over mechanism and mounted for movement after the pulling-over operation to carry the pulled-over shoe to the lasting mechanism.

14. A shoemaking machine having, in combination, a shoe rest arranged to hold a shoe at a distance from the working position of the operative and with its top face toward the operative for the pulling-over operation, mechanism to pull-over the shoe while it is so held, and toe lasting mechanism arranged nearer to the working position of the operative than the pulling-over mechanism, said shoe rest being movable for carrying the shoe away from pulling-over position and presenting it to the lasting mechanism with its sole face upward.

15. A shoemaking machine having, in combination, pulling-over mechanism, toe lasting mechanism, and means arranged for operation after the shoe has been pulled-over to present the shoe in a different angular relation to the horizontal for the lasting operation.

16. A shoemaking machine having, in combination, pulling-over mechanism arranged to pull-over a shoe in a position appropriate for the performance of that operation; lasting mechanism arranged to last an end portion of the shoe when the shoe is presented in a different angular relation to the horizontal which is advantageous for carrying out the lasting operation, and means arranged for use to shift the pulled-over shoe from one angular position to the other.

17. A shoemaking machine having, in combination, pulling-over mechanism arranged to pull-over a shoe in a position with its toe end pointing upwardly and the upper face of the forepart of the shoe toward the operative where the lines of the upper are observable by the operative, lasting mechanism arranged to last an end portion of the shoe presented in a different angular relation to a horizontal plane and the sole face in view of the operative, and means organized for use in transferring the shoe between pulling-over position and lasting position.

18. A shoemaking machine having, in combination, pulling-over and lasting mechanism adapted to operate successively on a shoe in successive postures of the shoe; and means for shifting the shoe between its successive postures without detachment from the machine, including a movement of the shoe about an axis extending laterally of the shoe whereby presentation of the shoe to the pulling-over mechanism may be made with the top face of the shoe toward the operative and presentation of the shoe to the lasting mechanism may be made with the sole face of the shoe uppermost.

19. A shoemaking machine having, in combination, mechanism for pulling-over a shoe while the shoe is top side toward the operative, mechanism for wiping the upper while the shoe is presented with its sole face in view of the operative, and shoe position controlling means mounted to turn about a horizontal side-to-side axis during the described change of position of the shoe between the pulling-over and the lasting operations.

20. A shoemaking machine having, in combination, pulling-over mechanism located generally to the rear of the location of the shoe and adapted to pull-over a shoe held in said location in a posture with its top face toward the operative and its toe higher than its heel, toe wiping mechanism located nearer to the operative than the pulling-over mechanism and arranged to operate with the shoe sole face uppermost, and means by which to move the shoe from said pulling-over position into position for said toe wiping mechanism to operate upon the shoe.

21. A shoemaking machine adapted for operating upon shoes by the successive steps of pulling-over and toe lasting performed in different postures of the shoe, said machine comprising, in combination, position controlling means shiftable with the shoe between such successive postures in a plane extending longitudinally of the shoe, pulling-over mechanism adapted to coöperate with the positioning means in one posture of the shoe, and lasting mechanism in coöperative relation with which the shoe is presented by the positioning means in a subsequent posture of the shoe.

22. A shoemaking machine having, in combination, pulling-over and wiping mechanisms adapted to operate successively on a shoe in successive postures of the shoe, and means for shifting the shoe about an axis extending laterally of the shoe for moving the shoe between its successive postures.

23. A shoemaking machine having, in combination, a pulling-over mechanism organized for operation under supervision of an operative on a shoe positioned with its toe pointing upwardly and the bottom of the shoe facing toward the rear of the machine, and a toe lasting mechanism occupying a position between the general vertical plane of the operative's body and a parallel plane through the pulling-over mechanism and into the field of operation of which the pulled-over shoe can be moved under tension.

24. A shoemaking machine having, in combination, a pulling-over mechanism organized for operation under supervision of an operative on a shoe positioned with its toe pointing upwardly and the bottom of the shoe facing toward the rear of the machine, a toe lasting mechanism occupying a position between the general vertical plane of the operative's body and a parallel plane through the pulling-over mechanism, and shoe position controlling means movable with the shoe for shifting the shoe from operative relation to the pulling-over mechanism to operative relation to the toe lasting mechanism.

25. A shoemaking machine having, in combination, a pulling-over mechanism organized for operation under supervision of an operative on a shoe positioned with its toe pointing upwardly, a toe lasting mechanism occupying a position between the general vertical plane of the operative's body and a parallel plane through the pulling-over mechanism, and means by which to move the shoe about an axis extending laterally of the shoe to shift it from operative relation to the pulling-over mechanism into operative relation to the toe lasting mechanism.

26. A shoemaking machine having, in combination, a pulling-over mechanism organized for operation under supervision of an operative on a shoe positioned with its toe pointing upwardly, a toe lasting mechanism occupying a position between the general vertical plane of the operative's body and a parallel plane through the pulling-over mechanism, and means by which to turn the toe of the pulled-over shoe forwardly in moving it toward operative relation to the lasting mechanism.

27. A shoemaking machine having, in combination, pulling-over mechanism arranged to pull-over a shoe in one position of the shoe, a lasting mechanism arranged to operate on an end portion of the shoe with the shoe in a different position, and operating mechanism including means for automatically transferring the pulled-over shoe under tension to the lasting position.

28. A shoemaking machine having, in combination, pulling-over mechanism arranged to pull-over a shoe in one position of the shoe; and a lasting mechanism arranged to operate on an end portion of the shoe with the shoe in a different position; said machine being organized to permit relative movement of said two mechanisms for transferring the shoe from pulling-over position to lasting position, to retain the pulled-over shoe in the lasting position, and to allow another shoe to be received in the pulling-over position.

29. A shoemaking machine having, in combination, pulling-over mechanism arranged to pull-over a shoe in one position of the shoe; and a lasting mechanism arranged to operate on an end portion of the shoe with the shoe in a different position; said machine being organized to effect transfer of the shoe from pulling-over to lasting position, to cause the pulling-over mechanism to deliver the shoe under tension to the control of the lasting mechanism, and to permit a movement of separation between said mechanisms while the shoe is retained in the lasting mechanism.

30. A shoemaking machine having, in combination, pulling-over mechanism arranged to pull-over a shoe in one position of the shoe, and a lasting mechanism arranged to operate on an end portion of the shoe with the shoe in a different position, said machine being organized to enable the pulling-over mechanism to deliver the pulled-over shoe under tension to the lasting mechanism and to permit one of said mechanisms to be moved after the pulling-over operation in a plane extending lengthwise of the shoe to transfer the shoe from the pulling-over position to the lasting position.

31. A shoemaking machine having, in combination, pulling-over mechanism arranged to pull-over a shoe in one location in the machine, and a lasting mechanism arranged to operate on an end portion of the shoe with the shoe in a different location in the machine, said machine being organized to permit the shoe to be transferred in pulled-over condition from the pulling-over location to the lasting location, and connected devices for effecting the transfer of the shoe and for effecting an operation of one of said mechanisms.

32. A shoemaking machine having, in combination, pulling-over mechanism arranged to pull-over a shoe in one position of the shoe, and a lasting mechanism arranged to operate on an end portion of the shoe with the shoe in a different position, said pulling-over mechanism being movable to carry the shoe from pulling-over position to lasting position and to deliver the shoe under tension to the lasting mechanism and return to the pulling-over location leaving the shoe in the lasting mechanism.

33. A shoemaking machine having, in combination, pulling-over mechanism and lasting mechanism arranged in a vertical plane extending longitudinally of the shoe, one of said mechanisms being movable with the shoe relatively to the other mechanism in a path substantially parallel to said plane to transfer the shoe from pulling-over position to lasting position.

34. A shoemaking machine having, in combination, pulling-over mechanism and lasting mechanism arranged in different locations in a plane which intersects both mechanisms to operate successively on a shoe occupying successively different positions, one of said mechanisms being movable with the shoe toward the other without altering its relation to said plane to transfer the shoe from pulling-over position to lasting position.

35. A shoemaking machine having, in combination, pulling-over mechanism and lasting mechanism arranged in a vertical plane, one of said mechanisms and the shoe being movable together in a path substantially parallel to said plane about an axis extending laterally of the shoe to transfer the shoe from pulling-over position to lasting position.

36. A shoemaking machine having, in combination, pulling-over mechanism and lasting mechanism arranged in a vertical plane to operate on a shoe successively, and means for moving the shoe in a path substantially parallel to said plane from the position in which it is pulled-over into the position in which it is to be lasted.

37. A shoemaking machine having, in combination, pulling-over mechanism and lasting mechanism arranged in a vertical plane, and means for effecting relative bodily movement along said plane between each of said mechanisms and the shoe to cause the shoe to be positioned in operative relation to the lasting mechanism following the operation of the pulling-over mechanism on the shoe.

38. A shoemaking machine having, in combination, pulling-over mechanism and lasting mechanism arranged in a vertical plane to operate on a shoe successively, and means for retaining the pulled-over shoe under tension and for moving the shoe along said plane from the pulling-over position into position to be operated upon by the lasting mechanism.

39. A shoemaking machine having, in combination, pulling-over mechanism organized to put an upper under tension about a last and hold the shoe for inspection of the upper, forepart lasting mechanism; and operating means to move the pulling-over mechanism holding the upper under tension for transferring the shoe to the lasting mechanism, to release the shoe to the lasting mechanism, and to cause the pulling-over mechanism to retire to give clearance above the shoe in the lasting mechanism.

40. A shoemaking machine having, in combination, mechanism for lasting the forepart of a shoe, mechanism for pulling-over the shoe arranged in the same vertical plane above the lasting mechanism, and means for operating the pulling-over and the lasting mechanisms, said machine being organized to hold the shoe upper under pulling-over tension while the shoe is moved along said plane from pulling-over position to position to be lasted.

41. A shoemaking machine having, in combination, pulling-over mechanism and lasting mechanism arranged in a plane which intersects both mechanisms and relatively movable along said plane to carry a pulled-over shoe under tension from pulling-over position to lasting position.

42. A shoemaking machine having, in combination, pulling-over mechanism and lasting mechanism arranged in a vertical plane extending from front to back of the machine, said pulling-over mechanism being movable in an arc along said plane to transfer a pulled-over shoe to the lasting mechanism.

43. A shoemaking machine having, in combination, pulling-over mechanism and lasting mechanism, said pulling-over mechanism being movable to transfer a pulled-over shoe to the lasting mechanism, the pulling-over mechanism being adapted to release the shoe to the control of the lasting mechanism and to withdraw therefrom to give clearance above the shoe during the lasting operation.

44. A shoemaking machine having, in combination, pulling-over mechanism and lasting mechanism organized to permit movement of the pulling-over mechanism to force the pulled-over shoe downwardly into the lasting mechanism.

45. A shoemaking machine having, in combination, pulling-over mechanism and lasting mechanism organized to cause the pulling-over mechanism to force the pulled-over shoe into the lasting mechanism, release the shoe and retire to give clearance above the shoe to facilitate lasting and fastening of the shoe.

46. A shoemaking machine having, in combination, pulling-over mechanism and toe embracing wipers arranged in a vertical plane, and means to cause said pulling-over mechanism to force the shoe down into the wipers and to cause the wipers to engage the shoe frictionally around the toe during such downward movement of the shoe.

47. A shoemaking machine having, in combination, mechanism for pulling-over a shoe, means adapted to embrace the toe of the shoe, and operating mechanism organized to effect operation of the pulling-over mechanism and to force the shoe into the toe embracing means in a direction to effect a wiping of the pulled-over upper toward the sole around the toe.

48. A shoemaking machine having, in combination, mechanism to pull-over a shoe including means for similarly positioning the toe ends of successive shoes longitudinally in the machine, toe embracing means mounted with capacity to adapt itself automatically to shape and size of different toes, and power driven operating mechanism organized to produce a predetermined relative movement between the embracing means and the shoe to effect wiping of the pulled upper toward the sole around the toe of the shoe.

49. A shoemaking machine having, in combination, pulling-over mechanism, lasting mechanism, and power operating mechanism organized to cause the pulling-over mechanism to tension the upper and come to rest for inspection of the shoe and when restarted to transfer the shoe to the lasting mechanism.

50. A shoemaking machine having, in combination, pulling-over mechanism, lasting mechanism for the forepart of the shoe, tacking mechanism, and power operating mechanism organized to transfer the shoe bodily from the pulling-over position to the lasting mechanism and to operate the tacking mechanism to fasten the upper at the sides of the forepart.

51. A shoemaking machine having, in combination, pulling-over mechanism, lasting mechanism, and power operating mechanism organized to transfer the shoe after the pulling-over operation under pulled-over tension from the pulling-over position to the lasting position.

52. A shoemaking machine having, in combination, pulling-over mechanism, lasting mechanism, and power operating mechanism organized to transfer the shoe under pulled-over tension from the pulling-over position to the lasting position and to cause the lasting mechanism to assume such control of the shoe that the pulling-over mechanism can retire leaving the forepart of the upper held under tension in the lasting mechanism.

53. A shoemaking machine having, in combination, pulling-over mechanism, means for operating said mechanism to pull a shoe, and means for moving said mechanism and the shoe downwardly and then moving said mechanism upwardly in a plane extending longitudinally of the shoe.

54. A shoemaking machine having, in combination, pulling-over mechanism, lasting mechanism subjacent to the pulling-over mechanism, means for operating the pulling-over mechanism to pull a shoe, and means for moving the pulling-over mechanism to transfer a pulled-over shoe into the field of operation of the lasting mechanism and then to return said pulling-over mechanism to its starting position to permit the lasting mechanism to operate upon the shoe.

55. A shoemaking machine having, in combination, pulling-over mechanism including grippers and a sole rest, means for operating said grippers and rest relatively in pulling-over a shoe, and means for moving said grippers and sole rest together along a substantially vertical plane to change the altitude of the shoe in the machine while holding the shoe against lateral tipping movement.

56. A shoemaking machine having, in combination, pulling-over mechanism including grippers and a sole rest, means for operating said grippers and rest relatively in pulling-over a shoe, a pivotal support about which the pulling-over mechanism is movable along a vertical plane extending longitudinally of the shoe, and means for moving said mechanism about said support.

57. A shoemaking machine having, in combination, pulling-over mechanism, means for operating said mechanism to pull a shoe, and means adapted for operation while said mechanism holds a shoe to tip said mechanism about a horizontal axis extending laterally of the shoe and located in the rear of the shoe.

58. A shoemaking machine having, in combination, a frame, a lasting mechanism, and a pulling-over mechanism supported in the frame above the lasting mechanism and movable in the frame to carry a shoe down into the lasting mechanism after pulling-over the shoe.

59. A shoemaking machine having, in combination, a frame, an upper fastening mechanism, and a pulling-over mechanism supported in the frame above the fastening mechanism and movable in the frame to carry a shoe down into the field of operation of the fastening mechanism after pulling over the shoe.

60. A shoemaking machine having, in combination, pulling-over mechanism, and operating mechanism for causing the pulling-over mechanism to do its work and to carry the shoe with its upper under tension to a position spaced away from the position in which the pulling-over operation was performed.

61. A shoemaking machine having, in combination, pulling-over mechanism comprising a sole rest and grippers, operating means for moving said rest and grippers relatively to tension an upper of a shoe over its last, a support for said pulling-over mechanism, and means connected to said support for moving said rest and grippers together to transfer the shoe bodily to a different location in the machine and for causing the operating means to hold the upper under tension during such transfer.

62. A shoemaking machine having, in combination, pulling-over mechanism comprising a sole rest and grippers, operating mechanism for moving said rest and grippers relatively to tension the upper of a shoe over its last, a support for said pulling-over mechanism, and means connected to said support for moving said rest and grippers and said operating mechanism together to transfer the shoe bodily under tension to a different location in the machine.

63. A shoemaking machine having, in combination, toe lasting mechanism arranged to operate on a shoe presented sole face upward, and means which is arranged to receive the shoe with its top face toward the operative where the position of the upper on the last can be seen and is mounted for movement to change the angular presentation of the shoe with reference to the plane of operation of the toe lasting mechanism and to carry the shoe to the lasting mechanism.

64. A shoemaking machine having, in combination, toe lasting mechanism arranged to operate on a shoe presented sole face upward, means arranged to receive the shoe with its top face toward the operative where the position of the upper on the last can be seen, and means to hold the upper in adjusted position on the last, said two means being mounted for movement together forwardly toward the operative and downwardly to present the shoe for the operation of the toe lasting mechanism.

65. A shoemaking machine having, in combination, toe lasting mechanism arranged to operate on a shoe presented sole face upward, means arranged to receive the shoe with its top face toward the operative where the position of the upper on the last can be seen, and means adapted for use in adjusting the position of the upper and holding the upper on the last, said two means being mounted for movement to change the angular presentation of the shoe with relation to the plane of the toe lasting mechanism and carry the shoe into position to receive the operation of the lasting mechanism.

66. A shoemaking machine having, in combination, toe lasting mechanism arranged to operate on a shoe presented sole face upward, means arranged to receive the shoe with its top face toward the operative and toe pointing upwardly at a sufficient distance from the operative to facilitate inspection of the toe to ascertain that the lines of the upper are correctly located on the last, and mechanism to pull-over the shoe while it is in the receiving position, said means being movable angularly toward the operative to carry the pulled-over shoe toward and present it to the lasting mechanism.

67. A shoemaking machine having, in combination, pulling-over mechanism comprising a sole rest and grippers; operating mechanism comprising a cam shaft and cams thereon for moving the rest and grippers relatively to tension the upper of a shoe over its last; and means for moving said grippers and rest about the axis of the shaft to carry the pulled shoe under tension to a different position in the machine.

68. A shoemaking machine having, in combination, a head, a sole rest carried by the head, a gripper, an updraw lever for the gripper fulcrumed in the head, a cam, a rocker fulcrumed in the head and located between the cam and the lever to swing the lever, and means to turn the cam relatively to the head to produce upper pulling and to turn the cam and the head together about the axis of the cam to transfer the shoe from one position to another in the machine.

69. A shoemaking machine having, in combination, a sole rest, a gripper, an updraw lever carrying the gripper, an updraw cam, and a pivoted rocker arranged to transmit upper pulling movement from the cam to the lever.

70. A shoemaking machine having, in combination, updraw levers carrying grippers, updraw cams, means to turn the cams a partial revolution for operating the levers, and a head carrying the levers and grippers and movable about the axis of said cams, said cams having paths shaped to cause the levers and grippers to maintain the upper under tension during the movement of the head.

71. A shoemaking machine having, in combination, a sole rest, side grippers, an updraw lever, a toe gripper having an operating bar extending from the updraw lever to the jaws of the gripper, an abutment against which the bar rests, and a connection between the bar and lever permitting the outer end of the bar to be adjusted on the lever forwardly and backwardly and by fulcruming on said abutment to adjust the toe gripper jaws toward and from the side grippers.

72. A shoemaking machine having, in combination, shoe position controlling means, pulling-over mechanism comprising toe end and side grippers and means for operating the grippers, said toe end gripper comprising a bar having jaws at one end and a movable connection with its operating means at the other end and arranged to fulcrum between its ends, and means for holding the bar in different positions of adjustment about the fulcrum to adapt the relation of the jaws of the toe end and side grippers to different lengths of shoes.

73. A shoemaking machine having, in combination, a sole rest, grippers arranged to engage the upper of a shoe at opposite sides of the sole rest, and means for adjustably determining the spread of said grippers for different widths of shoes comprising levers extending longitudinally of the shoe and engaging at one end with the grippers, transverse rack bars engaging the opposite ends of the levers, and a manually adjustable pinion located between and engaging both rack bars to move the levers in opposite directions simultaneously.

74. A shoemaking machine having, in combination, grippers arranged to engage an upper at opposite sides of a last, means to press the grippers inwardly, and means to hold the grippers outwardly comprising levers acting on the grippers, a spreader bar movable between and in engagement with the levers, movable fulcra for the levers, and means for simultaneously adjusting said fulcra relatively to each other to vary the spread of the grippers.

75. A shoemaking machine having, in combination, grippers arranged to engage an upper at opposite sides of a last, means to press the grippers inwardly, and means to hold the grippers outwardly comprising levers acting on the grippers, a spreader bar movable between and in engagement with the levers, parallel oppositely faced rack bars upon which the levers are fulcrumed, and a pinion located between said rack bars and having means by which to turn and hold it for adjusting and retaining said bars and grippers.

76. A shoemaking machine having, in combination, grippers arranged to engage an upper at opposite sides of a last, means to press the grippers inwardly, and means to hold the grippers adjustably outwardly comprising levers acting on the grippers, a wedge bar movable between the levers to spread the grippers, and means other than the spreader bar for effecting simultaneous and opposite adjustments of the grippers.

77. A shoemaking machine having, in combination, grippers arranged to engage an upper at opposite sides of a last, a gripper formed in relatively movable sections and arranged to engage the upper around the toe, means to press the grippers inwardly, means for adjusting the toe gripper and the pressing means therefor transversely of the machine and relatively to the side grippers, and separate spreading mechanisms for the toe and side grippers.

78. A shoemaking machine having, in combination, grippers arranged to engage an upper at opposite sides of a last, a gripper arranged to engage the upper at the toe, means to press the grippers inwardly, and separate mechanisms for spreading the toe and side grippers during the operation of the machine.

79. A shoemaking machine having, in combination, a gripper arranged to engage an upper at the toe of a last, means for yieldingly pressing the gripper inwardly, grippers arranged to engage the upper at the sides of the last, a bracket in which the side grippers are guided, a bracket slide in which the toe gripper and said inward pressing means are guided, and toe gripper spreading means arranged to partake of movement of the bracket slide and to perform its function similarly in different positions of the slide.

80. A shoemaking machine having, in combination, grippers arranged to engage an upper at opposite sides of a last, grippers formed in relatively movable sections and arranged to engage the upper around the toe, means to press the grippers inwardly, yielding means to spread the toe grippers, and adjustable means to spread the side grippers.

81. A shoemaking machine having, in combination, grippers formed in relatively movable sections and arranged to engage an upper around the toe of a last, means for yieldingly pressing the grippers inwardly, a spreader rod, a guide slide for the rod, a cam to move the guide slide, a pressure head on the rod, a stiff spring to transmit motion of the guide slide to the pressure head, and motion transmitting connections from the pressure head to the gripper sections permitting freedom of movement of the gripper sections relatively to one another in adapting their positions to the resistance offered by the work to spreading of said gripper sections.

82. A shoemaking machine having, in combination, toe grippers formed in sections that are movable forwardly and are relatively movable apart; and operating mechanism to operate said grippers, including means to cause the grippers to seize and to updraw the shoe upper; and independently operated means to spread the sections comprising a yieldingly advanced pressure head and diverging connections therefrom operating to push the gripper sections forwardly and apart in the directions of least resistance offered by the work.

83. A shoemaking machine having, in combination, a shoe rest, side grippers, a toe gripper which is movable forwardly, means to close the grippers and effect relative movement between the grippers and the rest to updraw the upper, and means which is independent of the updrawing movement and operates automatically to move the toe gripper forwardly.

84. A shoemaking machine having, in combination, pulling-over mechanism and means to operate said mechanism to pull-over a shoe; a heel rest, a toe rest, wipers organized for use in lasting the shoe; and means for effecting delivery of the pulled-over shoe to said rests in position to receive the operation of the wipers.

85. A shoemaking machine having, in combination, pulling-over mechanism and means to operate said mechanism to pull-over a shoe, toe embracing wipers, and power-operated means for effecting relative moment between the pulled-over shoe and the wipers to wipe the pulled upper over the periphery of the toe to the plane of the bottom of the shoe.

86. A shoemaking machine having, in combination, pulling-over mechanism, means to operate said mechanism to pull-over a shoe, toe embracing wipers, and power-operated means for effecting relative movement between the shoe and the wipers after the pulling-over operation to locate the wipers and the shoe in proper planes for the overwiping operation to be performed and for effecting the overwiping operation.

87. A shoemaking machine having, in combination, pulling-over mechanism, means to operate said mechanism to pull-over a shoe, toe embracing wipers, and power-operated means for effecting relative movement between the shoe and the wipers to wipe the pulled upper over the periphery of the toe to the plane of the bottom of the shoe and for automatically closing the wipers over the shoe bottom.

88. A shoemaking machine having, in combination, pulling-over mechanism, means to operate said mechanism to pull-over a shoe, toe embracing wipers spaced away from the shoe during the pulling-over operation, and power-operated means for effecting movement of the pulled-over shoe into position for the wipers to close over the shoe bottom and for effecting closing of the wipers.

89. A shoemaking machine having, in combination, pulling-over mechanism, means to operate said mechanism to pull-over a shoe, and wipers mounted for toe embracing movement in the plane of their overwiping faces for adaptation to the shape and lateral position of the toe, said pulling-over mechanism being movable to carry the pulled shoe into the wipers and cause them to embrace the toe.

90. A shoemaking machine having, in combination, pulling-over mechanism, means to operate said mechanism to pull-over a shoe, toe embracing wipers mounted for toe embracing movement in the plane of their overwiping faces for adaptation to the work during relative movement of the wipers and the shoe in a direction transverse to the plane of the shoe bottom, and means for effecting relative movements between the pulled shoe and the wipers to cause the wipers to adapt themselves to the shape of the toe and to locate the toe in a plane to receive the overwiping action of the wipers.

91. A shoe making machine having, in combination, pulling-over mechanism, means to operate the pulling-over mechanism, and toe embracing wipers, said pulling-over mechanism being movable to carry the pulled-over shoe down into the wipers and the wipers being thereafter movable inwardly over the shoe bottom to lay the upper into lasted position.

92. A shoemaking machine having, in combination, pulling-over mechanism, means to operate the pulling-over mechanism, toe embracing wipers, and means for relatively moving the shoe and the wipers in suitable engagement to effect a predetermined plural number of rubbing actions of the wipers on the toe portion of the shoe upper toward the plane of the shoe bottom.

93. A shoemaking machine having, in combination, pulling-over mechanism, means to operate the pulling-over mechanism, toe embracing wipers, and means organized to effect a predetermined plural number of relative movements of the pulled-over shoe and the wipers in the direction to press the shoe into the wipers to produce repeated upward wiping of the toe preparatory to overwiping of the toe.

94. A shoemaking machine having, in combination, pulling-over mechanism, means to operate the pulling-over mechanism, toe embracing wipers, means for moving the pulled-over shoe down into the wipers with the tensioned upper in rubbing contact with the wipers, and means for closing the wipers to effect overwiping of the upper.

95. A shoemaking machine having, in combination, pulling-over mechanism, means to operate the pulling-over mechanism, toe embracing wipers, power driven means for moving the pulled-over shoe into the wipers, and means for automatically closing the wipers over the shoe bottom.

96. A shoemaking machine having, in combination, pulling-over mechanism, means to operate said mechanism to pull-over a shoe, toe embracing wipers, and power-driven means for moving the pulled over shoe into the wipers.

97. A shoemaking machine having, in combination, toe embracing wipers, and power-operated means for relatively moving the shoe and the wipers in suitable engagement to effect automatically a predetermined plural number of upward rubbing actions of the wipers on the toe portion of the shoe upper, each terminating at a point short of that where the wipers are permitted to close inward over the shoe bottom.

98. A shoemaking machine having, in combination, shoe position controlling means, toe embracing wipers, and power-operated mechanism organized to move the shoe and wipers relatively in a direction oblique to the plane of the shoe bottom for effecting a predetermined plural number of upward rubbing actions of the wipers on the toe portion of the shoe.

99. A shoemaking machine having, in combination, shoe position controlling means, toe embracing wipers, and power-operated mechanism organized to move the shoe and wipers relatively to effect a shaping of the upper materials around the toe and to bring the work into position for the overwiping action of the wipers and then automatically to reciprocate the wipers a plurality of times over the margin of the shoe bottom.

100. A shoemaking machine having, in combination, shoe position controlling means, toe embracing wipers, means to tension the upper for the operation of the wipers, and power-operated mechanism organized to locate the shoe with the upper under tension in position to receive the overwiping action of the wipers and then to reciprocate the wipers a predetermined plural number of times over the margin of the shoe bottom.

101. A shoemaking machine having, in combination, pulling-over mechanism, toe embracing wipers, and operating and guiding means for relatively moving the wipers and the pulled-over shoe in a predetermined direction of such obliquity to the plane of the shoe bottom as to produce a wiping action directed upwardly and forwardly along the sides and the ends of the toe of the shoe.

102. A shoemaking machine having, in combination, shoe position controlling means, toe embracing wipers, and means for operating and guiding the shoe positioning means to move the shoe downwardly and backwardly into the wipers in such a direction as to produce a wiping action directed upwardly and forwardly along the sides and the end of the toe of the shoe.

103. A shoemaking machine having, in combination, toe embracing wipers and means for moving a shoe in a predetermined direction inclined to the plane of its sole face downwardly and backwardly into the wipers.

104. A shoemaking machine having, in combination, toe embracing wipers, operating means for effecting relative movement of the wipers and a shoe in an arc adapted to produce an upward and forward wiping action of the toe embracing wipers on the sides of the toe portion of the shoe, and means for closing the wipers to form the marginal portions of the upper over the shoe bottom.

105. A shoemaking machine having, in combination, toe embracing wipers, means for moving the shoe downwardly through the wipers, and a carrier for the wipers yieldingly mounted for movement to allow adaptation of the wipers to the path of the shoe as the shoe is moved downwardly and to cause the wipers to be closed against the sides of the shoe by the pressure of the shoe against them and to follow up and maintain continuous embracing relation to the toe of the shoe during the movement of the toe through the wipers.

106. A shoemaking machine having, in combination, an upright arm pivotally supported at its lower end, toe embracing wipers carried on the arm, means adapted for manipulation of the wipers to do their work, means for depressing the toe portion of a shoe through the wipers, and means for holding the arm yieldingly toward the shoe to permit the wipers to adapt their position to the shoe as the toe is moved through them.

107. A shoemaking machine having, in combination, an upright arm pivotally supported at its lower end, toe embracing wipers carried on the arm, means for depressing the toe portion of a shoe through the wipers, means for operating the arm to advance the wipers over the bottom of the depressed shoe, and a yielding element operating to permit the wipers to adapt themselves to the shoe as it is depressed and to impart a non-rigid quality to the advance motion of the wipers.

108. A shoemaking machine having, in combination, shoe position controlling means, toe embracing wipers, a carrier on which the wipers are adjustable toward and from the shoe and also in a direction transverse to the plane of the shoe bottom while held in substantially the same angular relation to said plane, and power-operating means connected with said carrier for advancing the wipers over the shoe bottom.

109. A shoemaking machine having, in combination, shoe position controlling means, toe embracing wipers supported in front of the toe to swing laterally of the shoe, power driven mechanism to operate the wipers and come to rest with the wipers holding the upper in lasted position over the toe of the shoe, and manual means adapted to be used for further operating the wipers.

110. A shoemaking machine having, in combination, shoe position controlling means, toe embracing wipers supported in front of the toe to swing laterally of the shoe, power-driven mechanism to operate the wipers and come to rest with the wipers holding the upper under pressure in lasted position, and manually controlled means for applying additional pressure to the upper held by the wipers.

111. A shoemaking machine having, in combination, shoe position controlling means, toe embracing wipers, power-driven mechanism to move the wipers lengthwise and laterally of the shoe and come to rest with the wipers holding the upper, and manually operated means for opening and closing the wipers while they are maintained in advanced position over the end of the toe.

112. A shoemaking machine having, in combination, shoe supporting means, toe embracing wipers, and power operating mechanism organized to advance the wipers over the end of the toe of the shoe and to close the wipers over the sides of the toe repeatedly while maintaining them in holding engagement with the upper at the end of the toe.

113. A shoemaking machine having, in combination, shoe supporting means, toe embracing wipers and power operating mechanism organized to wipe an upper over the toe of a shoe and then repeatedly to vary the pressure at the end of the toe while repeatedly reciprocating the wipers over the sides of the toe.

114. A shoemaking machine having, in combination, shoe supporting means, toe embracing wipers and power operating mechanism organized to advance the wipers over the end of the toe of the shoe and to close the wipers over the sides of the toe repeatedly without repeating the advancing movement over the end of the toe.

115. A shoemaking machine having, in combination, shoe supporting means, two embracing wipers and power operating mechanism organized to impart to the wipers lasting movements at the sides of the toe differing from and move effective than the lasting movements at the end of the toe.

116. A shoemaking machine having, in combination, shoe supporting means, toe embracing wipers and power operating mechanism organized to wipe an upper over the toe of a shoe and then repeatedly to reciprocate the wipers over the sides of the toe without correspondingly moving the wipers over the end of the toe.

117. A shoemaking machine having, in combination, shoe supporting means, toe embracing wipers, and power-driven means to operate the wipers constructed and arranged to produce a greater cumulative wiping effect at the sides of the toe than at the end of the toe.

118. A shoemaking machine having, in combination, shoe supporting means, toe embracing wipers, and power-driven means for operating the wipers constructed and arranged to produce over the corners and sides of the toe bottom repeated wiper movements having their greatest effective wiping action at the sides of the toe.

119. A shoemaking machine having, in combination, shoe position controlling means, toe embracing wipers, a pivotally supported upright arm carrying said wipers, an upright lever connected with the arm, and a wiper cam to vibrate the lever.

120. A shoemaking machine having, in combination, shoe position controlling means, toe embracing wipers, a pivotally supported upright arm carrying said wipers, a power-driven cam, and connections including a yielding element through which a predetermined throw of the cam is transmitted to the wipers to move them over the shoe bottom with provision for adaptation of the wiper movement to the toe of the particular shoe.

121. A shoemaking machine having, in combination, shoe position controlling means, toe embracing wipers, a pivotally supported upright arm carrying said wipers, a power-driven cam, and connections including a yielding element through which a predetermined throw of the cam is transmitted to the wipers to move them over the shoe bottom with provision for adaptation of the wiper movement to the toe of the particular shoe, and manual means by which to supplement the yieldingly effected power actuation of the wipers.

122. A shoemaking machine having, in combination, shoe position controlling means, toe embracing wipers, a pivotally supported upright arm carrying said wipers, a power-driven cam, and connections including a yielding element through which a predetermined throw of the cam is transmitted to the wipers to move them over the shoe bottom, and power-driven means for effecting relative movement of the wipers and the last to produce compression of the work between the wipers and the last.

123. A shoemaking machine having, in combination, toe embracing wipers, a toe rest, and means for jacking a pulled-over shoe upon the toe rest preparatory for the operation of the wipers including means operating to produce a stretching movement transversely of the shoe of that portion of the upper that extends across the top face of the ball of the last.

124. A shoemaking machine having, in combination, toe embracing wipers, means to operate the wipers to last the toe portion of a shoe, and a rest which sustains the shoe for the operation of the wipers, said rest comprising shoe engaging members so mounted as to move apart transversely of the toe portion of the shoe to stretch the upper.

125. A shoemaking machine having, in combination, toe lasting mechanism, means to operate said mechanism to last the toe portion of a shoe, and two toe supporting members adapted to hold the shoe for the lasting operation, said members being normally held in proximity to each other and movable apart automatically in response to engagement with the shoe.

126. A shoemaking machine having, in combination, toe embracing wipers, means to operate the wipers to last the toe portion of a shoe, two toe supporting members normally held in proximity to each other and movable apart automatically in response to pressure of the shoe against them, and means to force the last down upon the supporting members.

127. A shoemaking machine having, in combination, toe embracing wipers, means to operate the wipers to last the toe portion of a shoe, two toe supporting members normally held in proximity to each other and movable apart automatically in response to engagement with the shoe, and means for pressing the supporting members toward the shoe.

128. A shoemaking machine having, in combination, a work rest, upper stretching means arranged to engage the face of the work that is on the opposite side from the rest and comprising two members normally in proximity and movably mounted to separate automatically from each other in a direction to stretch the work in response to engagement with the work, and means for pressing said stretching means toward the work.

129. A shoemaking machine having, in combination, a sole rest for a shoe, upper stretching means arranged to engage the opposed face of the shoe at the ball of the last and comprising two members normally in proximity and movably mounted to separate automatically with a rubbing upper stretching movement in response to engagement with the shoe, mechanism for relatively operating the sole rest and said means to produce the specified stretching action, means for drawing the stretched upper over the edge of the last bottom, and means for fastening the upper.

130. A shoemaking machine having, in combination, toe lasting means and mechanism to hold a shoe for the operation of said means comprising shoe engaging members automatically movable apart in frictional contact with the upper in response to pressure of the shoe against said members; side wipers and tackers movable over the shoe bottom from opposite sides of the ball; and operating means for effecting such pressure to cause stretching of the upper by said members and to operate said wipers and tackers to overlay and fasten the stretched upper.

131. A shoemaking machine having, in combination, pulling-over mechanism, devices adapted to engage the vamp on the top face of the forepart of a shoe, said devices being normally maintained in proximity to each other and adapted for automatic movement apart while in contact with the vamp, and means for moving the shoe into engagement with said devices while the pulling-over mechanism holds the upper under tension after the pulling-over operation and for causing said devices to move apart in frictional contact with the vamp.

132. A shoemaking machine having, in combination, toe embracing wipers, shoe supporting means including a toe rest comprising two members normally in proximity and movably mounted to separate transversely of the shoe in response to pressure of the shoe, and means by which the wipers may be moved to effect pressure of the shoe against said members.

133. A shoemaking machine having, in combination, toe embracing wipers, shoe supporting means including a toe rest comprising two members normally in proximity and movably mounted to separate transversely of the shoe in response to pressure of the shoe, and means by which the toe rest can be raised to effect pressure of said members against the shoe.

134. A shoemaking machine having, in combination, toe embracing wipers, shoe supporting means including a toe rest comprising two members normally in proximity and movably mounted to separate transversely of the shoe in response to pressure of the shoe, means for yieldingly sustaining the toe rest in an elevated position, and means for moving the shoe in engagement with said members to effect their separation in frictional rubbing engagement with the upper and then the depression of the rest against the resistance of said yielding means.

135. A shoemaking machine having, in combination, a post and two members movably mounted on the head of the post and adapted to stand normally in proximity for engagement with the upper on the top face of the ball of a last and automatically to move apart in directions transversely of the last to effect frictional pulling of the upper in response to pressure of the upper on them.

136. A shoemaking machine having, in combination, a post, two levers pivoted to the head of the post, a spring arranged to hold the upper ends of the levers in proximity, means coöperating with the spring to determine the normal position of the levers, and members on the upper ends of the levers adapted to engage the upper and be moved relatively apart by the levers to stretch the upper.

137. A shoemaking machine having, in combination, a post, two levers pivoted to the head of the post, a spring arranged to hold the upper ends of the levers in proximity, and means coöperating with the spring to determine the normal position of the levers, said levers being arranged for engagement of their upper ends with the upper on the top face of the ball of a last and for automatic movement of said ends apart transversely of the last in frictional pulling engagement with the upper in response to pressure of the last.

138. A shoemaking machine having, in combination, pulling-over mechanism, a heel rest adapted to be engaged by the shoe, and means for operating the pulling-over mechanism and for moving the shoe into the heel rest.

139. A shoemaking machine having, in combination, pulling-over mechanism, a heel rest yieldingly held in position to receive the shoe, and power operating mechanism for the pulling-over mechanism including means for moving the pulled-over shoe rearwardly into the heel rest and causing the rest to adapt its position to that of the shoe.

140. A shoemaking machine having, in combination, pulling-over mechanism, a heel rest yieldingly held in position to receive the shoe, power operating mechanism for the pulling-over mechanism including means for moving the pulled-over shoe rearwardly into the heel rest and causing the rest to adapt its position to that of the shoe, and automatic means to set the heel rest firmly forward against the shoe and lock the rest after the shoe has been placed in it.

141. A shoemaking machine having, in combination, a heel end abutment, a toe rest, means to engage the shoe bottom, and operating mechanism constructed and arranged to cause the bottom engaging means to force the shoe into engagement with the toe rest and in time relation to such movement of the shoe to set the heel abutment forwardly against the shoe.

142. A shoemaking machine having, in combination, a heel end abutment, a toe rest, means to engage the shoe bottom and depress the shoe upon the toe rest and force it backwardly against the heel abutment, and connected operating mechanism for the depressing means and for the heel abutment constructed and arranged to force the abutment subsequently forward and lock it.

143. A shoemaking machine having, in combination, toe lasting wipers, a heel end abutment, and power operating mechanism for said wipers and abutment including pawl and ratchet mechanism constructed and arranged to set the heel end abutment forwardly against the shoe in time relation to the advance of the wipers over the toe of the shoe.

144. A shoemaking machine having, in combination, a toe rest and opposed clamping means for the forepart of a shoe, a heel abutment, toe embracing wipers, and operating mechanism for said parts organized to clamp the shoe and force it backwardly against the heel abutment and automatically lock the heel abutment in time relation to the operation of the wipers.

145. A shoemaking machine having, in combination, pulling-over mechanism, shoe resting mechanism, and operating mechanism to operate the pulling-over mechanism and then move the shoe into engagement with the resting mechanism, said resting mechanism being out of engagement with the shoe during the pulling-over operation.

146. A shoemaking machine having, in combination, pulling-over mechanism, upper fastening mechanism, and driving mechanism organized to operate the pulling-over mechanism to pull the upper and to transfer the shoe into the field of operation of the fastening mechanism and to cause said fastening mechanism to perform its function.

147. A shoemaking machine having, in combination, pulling-over mechanism arranged to operate on a shoe in one location in the machine, upper securing mechanism arranged to operate on the shoe when the shoe occupies a different location in the machine, and means for moving the shoe from the upper pulling location to the upper securing position while holding the upper under pulled-over tension.

148. A shoemaking machine having, in combination, pulling-over mechanism arranged to operate on a shoe in one location in the machine, upper securing mechanism arranged to operate on the shoe when the shoe occupies a different location in the machine, and operating mechanism organized to cause the pulling-over mechanism to perform its function and to hold the upper under tension while moving the shoe to the upper securing location and to cause the securing mechanism to perform its function.

149. A shoemaking machine having, in combination, pulling-over mechanism, tackers located remote from the operating position of the pulling-over mechanism, and driving mechanism organized to cause the pulling-over mechanism to pull the upper, then carry the shoe into the field of operation of the tackers, and then cause the tackers to fasten the upper by the insertion of tacks at the opposite sides of the shoe.

150. A shoemaking machine having, in combination, pulling-over mechanism, tackers and shoe resting means located remote from the operative position of the pulling-over mechanism, and operating mechanism organized to cause the pulling-over mechanism to pull the upper, then transfer the shoe to the resting means and then cause the tackers to advance over the shoe bottom and come to rest holding the shoe upon the resting means while the pulling-over mechanism returns to pulling-over position.

151. A shoemaking machine having, in combination, pulling-over mechanism, means located remote from the pulling-over mechanism and comprising devices to engage the forepart of the shoe on its top and its bottom faces, and operating mechanism organized to cause the pulling-over mechanism to pull the upper and to effect transfer of the shoe to said engaging devices and to cause clamping of the shoe between said devices.

152. A shoemaking machine, having, in combination, toe lasting means; and mechanism to hold a shoe for the operation of said means, comprising a toe rest and devices normally separated laterally and movable transversely of the shoe from opposite sides of the forepart into position over the shoe bottom, and tack holding means on said devices.

153. A shoemaking machine having, in combination, toe lasting means, and mechanism to hold a shoe for the operation of said means comprising a toe rest and side tackers normally separated laterally and movable transversely of the shoe from opposite sides of the forepart inwardly over the shoe bottom, said tackers being mounted independently of said toe lasting means, and means to operate the tackers to fasten the upper at the sides of the ball.

154. A shoemaking machine having, in combination, means to sustain a shoe with its sole face upward, and means to tack the upper to the innersole at the side of the shoe comprising an inverted hook-shaped structure the stem of which is movably supported below the shoe and the head of which is movable inwardly over the shoe bottom and includes a tack holder, said head being self-adjustable to the lateral contour of the shoe, and a driver movable in said head.

155. A shoemaking machine having, in combination, means to sustain a shoe with its sole face upward, and means to tack the upper to the innersole comprising at each side of the shoe an arm movably mounted below the shoe, a tack holder carried on the upper portion of the arm and arranged to project inwardly therefrom, a driver bar guided in the arm and having a portion projecting inwardly over the tack pocket in the tack holder, a driver extending downwardly from said inwardly projecting portion of the bar, and means for operating the arm toward and from the shoe and for operating the bar to move the driver toward and from the sole face of the shoe.

156. A shoemaking machine having, in combination, pulling-over mechanism arranged to pull over a shoe in a position with its toe end pointing upwardly and its bottom portion facing toward the rear of the machine, and lasting mechanism arranged to last an end portion of the shoe with the toe end pointing substantially horizontally and its sole face uppermost.

157. A shoemaking machine having, in combination, lasting mechanism, means for maintaining said mechanism normally in position to receive and operate upon a shoe, pulling-over mechanism, and means for transferring a shoe from the pulling-over mechanism to the lasting mechanism.

158. A shoemaking machine having, in combination, lasting mechanism, means for maintaining said mechanism normally in position to receive and operate upon a shoe, pulling-over mechanism above said lasting mechanism, and means for moving a pulled-over shoe downwardly into the lasting mechanism positioned to receive it.

159. A shoemaking machine having, in combination, lasting mechanism, means for maintaining said mechanism normally in position to receive and operate upon a shoe, pulling-over mechanism, and a carrier arranged to position a shoe for the pulling-over operation and movable to transfer the shoe from the pulling-over mechanism to the lasting mechanism.

160. A shoemaking machine having, in combination, lasting mechanism arranged to operate upon a shoe with the shoe bottom in view of the operative, pulling-over mechanism arranged to operate upon a shoe with the shoe in a different posture to present the top of the forepart in view of the operative, and shoe positioning means movable about an axis extending laterally with respect to the shoe to transfer the shoe from pulling-over position and present it bottom upward.

161. A shoemaking machine having, in combination, lasting mechanism normally in position to receive and operate upon a shoe, pulling-over mechanism at the rear of said lasting mechanism, and means for transferring a shoe from said pulling-over mechanism to said lasting mechanism.

162. A shoemaking machine having, in combination, lasting mechanism arranged to operate upon a shoe with the shoe bottom uppermost, pulling-over mechanism at the rear of said lasting mechanism arranged to operate upon a shoe with the toe of the shoe pointing upward and the top of the forepart facing the operative, and means for transferring the shoe from pulling-over position to lasting position.

163. A shoemaking machine having, in combination, pulling-over and lasting mechanisms arranged to operate successively on the forepart of a shoe in different postures of the shoe, and positioning means for the shoe movable about an axis extending laterally with respect to the shoe for changing the posture of the shoe in the interval between the pulling-over and lasting operations.

164. A shoemaking machine having, in combination, pulling-over mechanism and lasting mechanism, one of said mechanisms being mounted to swing with a shoe in a direction transverse to the plane of the shoe bottom about an axis displaced from the shoe to transfer the shoe from pulling-over position to lasting position.

165. A shoemaking machine having, in combination, pulling-over mechanism and lasting mechanism, said pulling-over mechanism being movable in a direction transverse to the plane of the bottom of a shoe carried thereby to transfer the pulled-over shoe bodily to the lasting mechanism.

166. A shoemaking machine having, in combination, pulling-over mechanism including grippers and a sole rest, and means for effecting relative movement of said grippers and sole rest to pull over a shoe, said pulling-over mechanism being movable about an axis extending laterally with respect to the shoe to change the posture of the shoe after the pulling-over operation.

167. A shoemaking machine having, in combination, means for pulling an upper over a last, lasting means for lasting an end of the shoe, and means for moving the shoe in a plane at substantially right angles to the plane of the bottom of the shoe and extending lengthwise of the shoe for shifting the shoe from pulling-over to lasting position.

168. A shoemaking machine having, in combination, pulling-over mechanism, upper fastening mechanism, and shoe positioning means movable after the pulling-over operation to present the shoe in a different position for the operation of the fastening mechanism.

169. A shoemaking machine having, in combination, pulling-over mechanism, upper fastening mechanism, and means for carrying the shoe from pulling-over position into a different position for the operation of the fastening mechanism and for causing the fastening mechanism to fasten the upper.

170. A shoemaking machine having, in combination, means for pulling-over a shoe, means for lasting the shoe, and power operated means for operating the pulling-over means and for moving the shoe after the pulling-over operation from pulling-over to lasting position.

171. A shoemaking machine having, in combination, pulling-over means, lasting means, power means for moving the shoe bodily from pulling-over to lasting position, and automatic means for causing the pulling-over means to release the shoe when the shoe is in lasting position.

172. A shoemaking machine having, in combination, means for pulling over a shoe in one position of the shoe, and means for lasting the shoe in another position in the machine, said pulling-over and lasting means being organized to permit one shoe to be operated upon by the pulling-over means while another shoe is in lasting position.

173. A shoemaking machine having, in combination, means for pulling-over a shoe, and means for lasting the shoe, said pulling-over means and lasting means being relatively movable to cause a shoe to be transferred from the pulling-over means to the lasting means and to permit another shoe to be operated upon by the pulling-over means while the first shoe remains in the lasting means.

174. A shoemaking machine having, in combination, pulling-over means for pulling-over a shoe, means for supporting the shoe in pulling-over position, said supporting means being movable to carry the shoe from pulling-over to a lasting position, and lasting means having a part to act upon the pulled-over upper materials as the shoe is shifted to lasting position to wipe the upper about the end of the shoe.

175. A shoemaking machine having, in combination, pulling-over means, toe lasting means, and means for shifting the shoe from pulling-over position to lasting position and causing the upper to be wiped soleward about the toe of the shoe by the lasting means as the shoe is moved into lasting position.

176. A shoemaking machine having, in combination, pulling-over means for pulling-over a shoe in one position with the toe of the shoe pointing in one direction, lasting means for lasting the shoe in another position with the toe of the shoe pointing in another direction, and means for shifting the shoe to cause the lasting means to wipe the pulled-over upper about the end of the shoe as it is moved into lasting position.

177. A shoemaking machine having, in combination, pulling-over means, lasting means, and means for shifting the shoe from pulling-over to lasting position in a plane passing longitudinally of the shoe to cause the lasting means to wipe the pulled-over upper about the shoe as the shoe is moved into lasting position.

178. A shoemaking machine having, in combination, pulling-over means organized to pull over a shoe in one position, lasting means for lasting the shoe in another position, and means for shifting the shoe about an axis extending laterally of the shoe from pulling-over to lasting position while the shoe is held by the pulling-over means, said lasting means being arranged to wipe the pulled-over upper about the shoe as the shoe is moved to lasting position.

179. A shoemaking machine having, in combination, pulling-over means organized to pull over a shoe while in one position with the upper presented to the operative, lasting means for lasting the shoe in another position while the bottom of the shoe is presented to the operative, means for shifting the shoe from pulling-over to lasting position while the shoe is held by the pulling-over means, and means for releasing the pulling-over means after the upper materials have been engaged by the lasting means.

180. A shoemaking machine having, in combination, pulling-over means, lasting means, and shoe-shifting means adapted to shift the shoe from a pulling-over position with the toe pointing upwardly to a substantially horizontal lasting position in a direction to cause the lasting means to wipe the upper materials about the forepart of the shoe toward the bottom of the shoe as the shoe is moved to lasting position.

181. A shoemaking machine having, in combination, pulling-over means organized to pull over a shoe, forepart lasting means, a support for the toe of the shoe when in lasting position, and means for shifting the shoe from pulling-over to lasting position to bring the toe of the shoe into engagement with the toe support.

182. A shoemaking machine having, in combination, pulling-over means organized to pull over a shoe, forepart lasting means for lasting the forepart of a shoe, a toe rest for supporting the toe end of the shoe when in lasting position, and means for shifting the shoe from pulling-over position to lasting position in a direction to cause a part of the lasting means to wipe the upper about the forepart of the shoe as the shoe is moved into engagement with the toe rest.

183. A pulling-over and lasting machine to perform successively the operations of pulling-over and lasting a shoe having, in combination, pulling-over means, lasting means, operating mechanism organized to cause the pulling-over means to seize the upper and stretch it, means for moving the shoe subsequently from pulling-over to lasting position, and mechanism for automatically operating the lasting means when the shoe is in lasting position.

184. A pulling-over and lasting machine to perform successively the operations of pulling-over and lasting the forepart of a shoe having, in combination, power-operated pulling-over means to grasp the upper at a plurality of points around the forepart and pull the upper, means for shifting the pulled-over shoe from pulling-over to lasting position, means to wipe the upper about the forepart of the shoe as it is moved to lasting position, and automatic means for operating the wiping means to overwork the upper.

185. A shoemaking machine having, in combination, forepart lasting means, power-operated mechanism organized to pull-over a shoe and hold the upper under tension until the shoe has been operatively positioned with relation to the lasting means and then to release the upper, and means for shifting the pulled-over shoe from pulling-over to lasting position.

186. A shoemaking machine having, in combination, pulling-over means for shaping the upper of a shoe about a last, means for wiping and clamping the upper about the last as the shoe is shifted from pulling-over to another position, and means for operating the wiping means to over-work the upper into lasted position.

187. A pulling-over and lasting machine having, in combination, means for pulling an upper on a last, means for adjusting the pulled upper transversely around the last, means for supporting the last in stationary position during the action of the said means and adapted to shift the last and upper to another position, means for wiping the upper about the last as the last and upper are shifted to second position, and means for operating said wiping means to over-work the upper into lasted position.

188. A pulling-over and lasting machine having, in combination, means for pulling an upper on a last while the last is held in stationary position, means for adjusting the pulled upper transversely around the stationary last, means for shifting the last and upper to another position after the upper has been adjusted on the last, means for clamping the upper upon the last after the upper and the last have arrived in the second position, and means for overworking the upper.

189. A shoemaking machine having, in combination, means for pulling an upper on a last while the last is held in one position, means for shifting the last and upper to another position, and means for overworking the upper when in the second position, said machine having means for moving the upper around the last transversely and longitudinally while the last is held stationary.

190. A machine of the class described having, in combination, shoe positioning means, upper engaging grippers, levers connected to said grippers to move them in directions transverse to the plane of the shoe bottom to pull the upper, an operating shaft extending laterally of the shoe, and connections between said shaft and levers for operating the grippers.

191. A machine of the class described having, in combination, means for positioning a shoe with its toe end pointing upward and the top of the forepart facing the operator's working position, upper engaging grippers, levers at the rear of the shoe connected to said grippers, an operating shaft extending laterally of the shoe and substantially between the shoe and said levers, and connections between said shaft and levers for operating the grippers.

192. A machine of the class described having, in combination, means for positioning a shoe with its toe end pointing upward and the top of the forepart facing the operator's working position, upper engaging grippers, means for operating said grippers, comprising a cam shaft extending laterally of the shoe, a driving shaft extending in angular relation to the cam shaft, and operating connections between said cam shaft and driving shaft.

193. A machine of the class described having, in combination, means for positioning a shoe with its toe end pointing upward and the top of the forepart facing the operator's working position, upper engaging grippers, gripper operating means comprising a cam shaft extending laterally of the shoe, a driving shaft extending substantially at right angles to said cam shaft, connections between the cam shaft and the driving shaft, and a clutch for controlling the operation of said driving shaft.

194. A machine of the class described having, in combination, means for positioning a shoe with its toe end pointing upward and the top of the forepart facing the operator's working position, upper engaging grippers, substantially upright levers at the rear of the shoe for imparting upper pulling movement to said grippers, and means comprising a cam shaft extending substantially between said levers and the shoe for operating said levers.

195. A machine of the class described having, in combination, means for positioning a shoe with its toe end pointing upward and the top of the forepart facing the operator's working position, upper engaging grippers, gripper operating levers at the rear of the shoe, a cam shaft extending substantially between said levers and the shoe for operating said levers, a driving shaft arranged in angular relation to said cam shaft, and operating connections between said cam shaft and driving shaft.

196. A machine of the class described having, in combination, means for positioning a shoe with its toe end pointing upward and the top of the forepart facing the operator's working position, upper engaging grippers, gripper operating levers at the rear of the shoe, and means comprising a substantially horizontal cam shaft extending laterally of the shoe substantially between the shoe and said levers for imparting operative movement to the levers.

197. A machine of the class described having, in combination, shoe positioning means, upper pulling instrumentalities, and mechanism for operating said instrumentalities comprising a driving shaft, a power shaft for imparting operative movement to said driving shaft, a cam shaft arranged to be operated by said driving shaft, reduction gearing between said power shaft and driving shaft, and means comprising a clutch for controlling the operation of said power shaft.

198. A machine of the class described having, in combination, means for positioning an upper and a last, upper pulling instrumentalities, and mechanism for operating said instrumentalities comprising a driving shaft, a power shaft for imparting operative movement to said driving shaft, a cam shaft arranged to be operated by said driving shaft, gearing connecting said power shaft and driving shaft comprising a comparatively large gear on the driving shaft and a smaller gear on the power shaft, and means for controlling the operation of the power shaft to cause the machine to perform its cycle of operations through one revolution of the driving shaft effected in a series of successive steps between which the machine comes to rest.

199. A machine of the class described having, in combination, means for positioning an upper and a last, upper pulling instrumentalities, and means for operating said instrumentalities comprising a driving shaft, a power shaft for imparting operative movement to said driving shaft, gearing connecting said power shaft to the driving shaft comprising a comparatively large gear on the driving shaft and a smaller gear on the power shaft, a clutch on the power shaft, and means for controlling said clutch from the driving shaft.

200. A machine of the class described having, in combination, pulling-over mechanism, lasting mechanism, means for operating said pulling-over mechanism to pull over a shoe while a previously pulled-over and lasted shoe is setting in the lasting mechanism, and means for operating the lasting mechanism subsequently to release the lasted shoe and for causing the pulled-over shoe to be delivered to the lasting mechanism and operated upon by said mechanism.

201. A machine of the class described having, in combination, pulling-over mechanism, lasting mechanism, means for operating said pulling-over mechanism to pull over a shoe while a previously pulled over and lasted shoe is positioned in the lasting mechanism and then to hold the upper of the shoe under tension with the machine at rest, means operative upon a subsequent starting of the machine to cause the lasting mechanism to release the lasted shoe, and means operative when the machine is started a third time to cause the pulling-over mechanism to transfer the pulled-over shoe to the lasting mechanism and to cause the lasting mechanism to operate upon and then hold the shoe.

202. A machine of the class described having, in combination, means for pulling over a shoe in one position in the machine and for transferring the shoe to a different position with the upper held under tension, and lasting mechanism into operative relation to which the shoe is carried in its transferring movement and comprising wipers arranged to embrace the end of the shoe and to wipe the upper toward the plane of the shoe bottom in said movement of the shoe, said transferring means being constructed and arranged to reciprocate the shoe for wiping the upper a plurality of times about the end of the shoe before the shoe is brought finally to rest.

203. A machine of the class described having, in combination, means for pulling over a shoe in one position of the shoe, means for lasting the shoe in a different position, said pulling-over means and the shoe being movable together to transfer the shoe to lasting position, and upper clamping means into operative relation to which the shoe is moved in its approach to lasting position to hold the upper on the last and permit its release by the pulling-over means.

204. A machine of the class described having, in combination, means for pulling over a shoe in one position of the shoe, means for lasting the shoe in a different position, means comprising a shoe bottom rest movable with the shoe to transfer it from pulling-over position to lasting position, and means for clamping the shoe on the top of the forepart and on the shoe bottom to hold the shoe and permit its release by the pulling-over means.

205. A machine of the class described having, in combination, means for pulling over a shoe in one position of the shoe, means for lasting the toe end of the shoe in a different position, means for transferring the shoe from pulling-over position to toe lasting position, and means arranged to be applied to the shoe subsequently to the pulling-over operation for clamping the shoe on the top of the forepart and on the shoe bottom to hold the shoe and permit its release by the pulling-over means.

206. A machine of the class described having, in combination, pulling-over means, shoe positioning means movable to transfer the shoe after the pulling-over operation to a different position for fastening, fastening means arranged to operate upon the shoe in said different position, and fastener transferring means movable with the shoe and arranged to receive fasteners and deliver them to the fastening means.

207. A machine of the class described having, in combination, pulling-over mechanism movable with a shoe after the pulling-over operation to transfer the shoe to a different position for fastening, tackers arranged to operate upon the shoe in said different position, and tack holders movable with the pulling-over mechanism and arranged to receive tacks when said mechanism is in its first position and to deliver them to the tackers as the shoe is moved to fastening position.

208. In a machine of the class described, the combination with means for positioning a last and an upper and means for pulling the upper over the last, of presser members mounted for movement respectively in opposite directions in frictional engagement with the upper to stretch it transversely of the last, a supporting member upon which said presser members are mounted, and means for operating said supporting member to cause said presser members to do their work.

209. In a machine for shaping stock to a form, a pair of stock stretching members relatively movable to cause portions of the respective members to separate from each other, and yielding means between said members for positioning the members normally with said portions in proximity to each other while permitting them to be separated by pressure against the stock to stretch the stock over the form.

210. In a machine for shaping stock to a form, a pair of stock stretching members, a supporting member upon which said stretching members are movably mounted, and means for positioning said stretching members in a normal idle position in proximity to each other while permitting them to be moved apart to stretch the stock over the form.

211. In a machine for shaping stock to a form, a pair of stock stretching members, a support upon which said members are mounted for relative movement, and spring means between said members for positioning them normally with portions of the respective members in proximity to each other while permitting said portions to be separated by pressure against the stock to stretch the stock over the form.

212. In a machine for shaping stock to a form, a pair of stock stretching members, a supporting member upon which said stretching members are mounted to assume a normal idle position in proximity to each other, and means on said stretching members for engaging the stock frictionally and stretching it over the form upon a relative separating movement of said members.

213. In a machine for shaping stock to a form, a pair of stock stretching members relatively movable to cause portions of the respective members to separate, a support upon which said members are mounted, spring means for positioning said members normally with said portions in proximity to each other while permitting them to be separated by pressure against the stock, and means for effecting relative movement of said support and the work to render said members effective to stretch the stock.

214. In a machine for shaping stock to a form, a pair of stock stretching members, a support upon which said members are pivoted to cause portions of the respective members to separate from each other in definite paths, and spring means tending to position the members with said portions normally in proximity to each other while permitting them to separate to stretch the stock.

215. In a machine for shaping stock to a form, a pair of stock stretching members, and a support upon which said members are pivoted for movement in definite paths respectively in opposite directions in response to pressure against the stock to stretch the stock over the form.

216. In a machine for shaping stock to a form, a supporting member, a pair of levers pivoted on said supporting member and constrained to move in substantially opposite directions to cause adjacent ends of the levers to separate, and means for positioning the levers normally with said ends in proximity to each other while permitting them to be separated by pressure against the stock.

217. In a machine for shaping stock to a form, a supporting member, a pair of levers pivoted on said supporting member for movement to cause adjacent ends of the levers to separate, and spring means between the other ends of said levers for positioning them normally with said first named ends in proximity to each other while permitting said ends to be separated by pressure against the stock to stretch the stock.

218. In a machine for shaping stock to a form, the combination with a support, of two levers pivoted on said support to swing about a fixed axis, spring means tending to hold the outer ends of the levers in proximity, means coöperating with said spring means to determine the normal position of the levers, and means on said levers arranged to engage the stock and to be moved relatively apart by the levers to stretch the stock.

219. In a machine of the class described, presser members for operating upon the upper of a shoe on a last at the top of the forepart to stretch it transversely of the last, and a support upon which said members are pivoted for relative movement about a common axis extending lengthwise of the shoe.

220. In a machine of the class described, presser members for operating upon the upper of a shoe on a last frictionally to stretch it over the last, a support upon which said members are pivoted for movement in opposite directions about a common axis, and spring means tending to swing said members toward each other.

221. In a machine of the class described, a pair of levers having adjacent end portions relatively movable apart to stretch the upper of a shoe transversely over the forepart of a last, a support upon which said levers are pivoted, spring means for positioning said end portions of the levers normally in proximity to each other, means on said levers for engaging the upper of the shoe, and mechanism for effecting relative movement of said levers and the shoe to cause said means to engage the top of the forepart of the upper and stretch the upper.

222. In a machine of the class described, means for pulling an upper over a last, devices for engaging the upper on the top face of the forepart of the shoe, a supporting member on which said devices are mounted and held normally in comparative proximity to each other while permitting them to move apart in contact with the upper, and means for effecting relative movement of the shoe and said devices in a direction substantially perpendicular to the plane of the shoe bottom while the pulling-over mechanism holds the upper under tension after the pulling-over operation to cause said devices to move apart and stretch the upper.

223. In a machine of the class described, the combination with shoe positioning means, of a device for engaging the upper of the shoe at the top of the forepart, a support upon which said upper engaging device is movably mounted, yielding means tending to move said upper engaging device relatively to the support in the direction of the shoe while permitting relative movement of the support and said device upon engagement of the device with the shoe, and mechanism for locking said support and upper engaging device against such relative movement after said device has engaged the shoe.

224. In a machine of the class described, the combination with means for positioning a last and an upper, of presser members relatively movable in engagement with the upper to stretch it over the last, a holder upon which said members are mounted, a support for said holder, yielding means tending to move the holder relatively to said support in the direction of the shoe, and means for operating positively upon said holder after engagement of said members with the shoe to position the members firmly in engagement with the shoe.

In testimony whereof I have signed my name to this specification.

RONALD F. McFEELY